United States Patent
Hattori et al.

(10) Patent No.: US 7,975,085 B2
(45) Date of Patent: Jul. 5, 2011

(54) SIGNAL PROCESSING DEVICE AND CONTROL METHOD, SIGNAL PROCESSING METHOD, PROGRAM, AND SIGNAL PROCESSING SYSTEM

(75) Inventors: Masaaki Hattori, Chiba (JP); Tetsujiro Kondo, Tokyo (JP); Hideo Nakaya, Kanagawa (JP); Nobuyuki Asakura, Tokyo (JP); Toshihiko Hamamatsu, Saitama (JP); Yasunobu Node, Tokyo (JP); Masanori Machimura, Tokyo (JP); Hiroto Kimura, Tokyo (JP); Yasuhiko Suga, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 12/416,518

(22) Filed: Apr. 1, 2009

(65) Prior Publication Data

US 2009/0265502 A1    Oct. 22, 2009

(30) Foreign Application Priority Data

Apr. 18, 2008    (JP) .................................. 2008-109267

(51) Int. Cl.
*G06F 3/00*    (2006.01)
*G06F 13/00*    (2006.01)
*G06F 13/12*    (2006.01)
*G06F 13/18*    (2006.01)

(52) U.S. Cl. ............. 710/104; 710/10; 710/14; 710/110
(58) Field of Classification Search .................. 710/104
See application file for complete search history.

(56) References Cited

U.S. PATENT DOCUMENTS

| | | | |
|---|---|---|---|
| 6,105,083 A | | 8/2000 | Kurtze et al. |
| 6,973,022 B1* | | 12/2005 | Machida et al. .............. 370/216 |
| 2004/0008256 A1* | 1/2004 | Kim ............................... 348/148 |
| 2004/0039835 A1* | 2/2004 | Glenn et al. ................... 709/231 |
| 2006/0028551 A1* | 2/2006 | Kim ............................... 348/159 |
| 2007/0230913 A1* | 10/2007 | Ichimura ......................... 386/96 |
| 2009/0244393 A1* | 10/2009 | Mizutani et al. .............. 348/705 |
| 2009/0278995 A1* | 11/2009 | Oh ................................ 348/731 |
| 2010/0026695 A1* | 2/2010 | Terada et al. .................. 345/545 |

FOREIGN PATENT DOCUMENTS

EP    0 509 140 A1    10/1992

(Continued)

OTHER PUBLICATIONS

Tanenbaum, Andrew S.; "Structured Computer Organization"; Prentice-Hall, Inc.; 1990; Third Edition; pp. 11-13.*

*Primary Examiner* — Ryan M Stiglic
(74) *Attorney, Agent, or Firm* — Oblon, Spivak, McClelland, Maier & Neustadt, L.L.P.

(57) ABSTRACT

A signal processing device controls a plurality of signal processing units that process an input signal inputted via a signal line with wide bandwidth, via a control line with narrow bandwidth or the signal line, and includes: a storing unit configured to store correspondence information that associates instruction information indicating an instruction of control with respect to each of the signal processing units, with control information related to all of the plurality of signal processing units, among pieces of control information necessary for each of the signal processing units to execute content of control; and a transmitting unit configured to transmit the control information associated with the instruction information by the correspondence information, to the plurality of signal processing units via the signal line, when control is instructed with respect to the plurality of signal processing units.

16 Claims, 24 Drawing Sheets

FOREIGN PATENT DOCUMENTS

| | | |
|---|---|---|
| JP | 62-172425 | 7/1987 |
| JP | 3-172956 | 7/1991 |
| JP | 5-216847 | 8/1993 |
| JP | 6-96001 | 4/1994 |
| JP | 8-171626 | 7/1996 |
| JP | 2003-122702 | 4/2003 |

* cited by examiner

FIG. 11

| COMMAND CODE | FUNCTION NAME |
|---|---|
| 0 | CHANGE TO 480i VIDEO FORMAT |
| 10 | CHANGE TO 480p VIDEO FORMAT |
| 20 | CHANGE TO 720p VIDEO FORMAT |
| 30 | CHANGE TO 1080i VIDEO FORMAT |
| 40 | CHANGE TO 1080p VIDEO FORMAT |
| 50 | CHANGE TO WXGA VIDEO FORMAT |
| 60 | CHANGE TO 4K2Kp VIDEO FORMAT |

FIG. 17

| COMMAND CODE | FUNCTION NAME |
|---|---|
| 100 | CHANGE TO Fs = 32 kHz/LPCM |
| 200 | CHANGE TO Fs = 44.1 kHz/LPCM |
| 300 | CHANGE TO Fs = 48 kHz/LPCM |
| 400 | CHANGE TO Fs = 64 kHz/LPCM |
| 500 | CHANGE TO Fs = 88.2 kHz/LPCM |
| 600 | CHANGE TO Fs = 96 kHz/LPCM |
| 700 | CHANGE TO Fs = 192 kHz/LPCM |
| 800 | CHANGE TO Dolby Digital |
| 900 | CHANGE TO Dolby Digital EX |
| 1000 | CHANGE TO Dolby Pro Logic II |

SIGNAL PROCESSING DEVICE AND CONTROL METHOD, SIGNAL PROCESSING METHOD, PROGRAM, AND SIGNAL PROCESSING SYSTEM

BACKGROUND OF THE INVENTION

1. Field of the Invention

The present invention relates to a signal processing device and a control method, a signal processing method, a program, and a signal processing system. More specifically, the present invention relates to a signal processing device and a control method, a signal processing method, a program, and a signal processing system, which make it possible to perform stable control of controlled units even when the number of controlled units increases.

2. Description of the Related Art

In signal processing systems according to the related art, a control unit that controls a plurality of signal processing units is connected to each of the signal processing units via a non-high-speed communication path used exclusively for control purposes (hereinafter, referred to as control line as appropriate), thus controlling the signal processing units. This configuration is appropriate for cases where the processing capacity or communication bandwidth of the control unit is sufficiently large relative to the number of signal processing units that are controlled units.

For example, the following system has been proposed (see, for example, Japanese Unexamined Patent Application Publication No. 6-96001). In the system, a bus is connected in a loop to a control unit including a write interface unit for the write direction and a read interface unit for the read direction, in such a way that the bus makes a loop from the write interface unit to the read interface unit. One or more controlled units are connected to this bus. A signal sent out to the bus from the write interface unit of the control unit is received by the controlled units, and in response to this, the corresponding controlled unit sends out a signal to the read interface unit of the control unit via the bus.

In the case of adding a signal processing unit additionally in the signal processing system described above, each time a signal processing unit is added, the volume of control information to be supplied from the control unit to the signal processing units increases, so the load on the control unit increases, and spare bandwidth decreases. As a result, the processing capacity or communication bandwidth of the control unit becomes insufficient, so there is even a risk of breakdown of control in the signal processing system.

Accordingly, to avoid breakdown of control in the signal processing system as described above, it is generally conceivable to enlarge the bandwidth of the control line, or increase the processing capacity of the control unit.

SUMMARY OF THE INVENTION

However, newly replacing the control system of a signal processing system which has been built once is a cumbersome task for the user of the signal processing system, and involves cost. Thus, in many cases, the entire signal processing system is changed. Changing the entire signal processing system involves more cost.

The patterns of control performed in the signal processing system described above can be roughly classified into two. One is a control which is performed when changing the whole or part of the function of the signal processing system into entirely another function, and the other is a control which is performed when changing operating parameters or the like used for the function while keeping the function itself unchanged.

As the former, for example, a conceivable case is one in which the format of an input signal inputted to the signal processing system is changed. In this case, it is necessary to greatly change the settings of the entire signal processing system, resulting in a temporary increase in the volume of control information supplied to the signal processing units by the control unit.

On the other hand, as the latter, for example, a conceivable case is one in which the brightness or contrast of video is changed. In this case, it suffices to make changes to some of the parameters with respect to some of the signal processing units. Hence, the volume of control information supplied to the signal processing units by the control unit is small in comparison to that in the former case.

That is, there is an unbalance between the volumes of control information supplied by the control unit to the signal processing units.

Generally speaking, in the signal processing system, a signal line and a control line each serving as a signal communication path are provided independently since signals on these lines differ in their intended use and purpose.

In contrast, in recent years, there have been proposed techniques in which the signal line and the control line are combined together in the architecture of a computer.

However, in order to process image signals or audio signals being successively supplied without delay, it is necessary to make the communication speeds of the CPU (Central Processing Unit), memory, bus, and the like many times faster than the speed of the image signals or audio signals. Considering such factors as an increase in power consumption or heat generation, and the risk of latent bugs in the software used for the signal processing, such a configuration is not appropriate.

It is desirable to allow stable control of controlled units to be performed even when the number of controlled units increases, by selectively using the control line and the signal line as a communication path for transmitting control information.

According to an embodiment of the present invention, there is provided a signal processing device which controls a plurality of signal processing units that process an input signal inputted via a signal line with wide bandwidth, via a control line with narrow bandwidth or the signal line, including: storing means for storing correspondence information that associates instruction information indicating an instruction of control with respect to each of the signal processing units, with control information related to all of the plurality of signal processing units, among pieces of control information necessary for each of the signal processing units to execute content of control; and transmitting means for transmitting the control information associated with the instruction information by the correspondence information, to the plurality of signal processing units via the signal line, when control is instructed with respect to the plurality of signal processing units.

The signal processing device may further include switching means for switching the signal line from a communication path for the input signal to a communication path for a control signal containing the control information, on the basis of the correspondence information.

The signal processing device may further include selecting means for selecting the control line or the signal line as a communication path for transmitting a control signal containing the control information, on the basis of the correspondence information.

The transmitting means may transmit the control information to the plurality of signal processing units connected in a daisy chain, via the signal line.

The control information may indicate content of a change to a function of each of the signal processing units.

According to an embodiment of the present invention, there is provided a control method for a signal processing device that controls a plurality of signal processing units that process an input signal inputted via a signal line with wide bandwidth, via a control line with narrow bandwidth or the signal line, including the steps of: storing correspondence information that associates instruction information indicating an instruction of control with respect to each of the signal processing units, with control information related to all of the plurality of signal processing units, among pieces of control information necessary for each of the signal processing units to execute content of control; and transmitting the control information associated with the instruction information by the correspondence information, to the plurality of signal processing units via the signal line, when control is instructed with respect to the plurality of signal processing units.

According to an embodiment of the present invention, there is provided a program for causing a computer to execute a process of controlling a signal processing device that controls a plurality of signal processing units that process an input signal inputted via a signal line with wide bandwidth, via a control line with narrow bandwidth or the signal line, the process including the steps of: storing correspondence information that associates instruction information indicating an instruction of control with respect to each of the signal processing units, with control information related to all of the plurality of signal processing units, among pieces of control information necessary for each of the signal processing units to execute content of control; and transmitting the control information associated with the instruction information by the correspondence information, to the plurality of signal processing units via the signal line, when control is instructed with respect to the plurality of signal processing units.

According to the above-mentioned embodiments of the present invention, correspondence information is stored. The correspondence information associates instruction information indicating an instruction of control with respect to each of the signal processing units, with control information related to all of the plurality of signal processing units, among pieces of control information necessary for each of the signal processing units to execute content of control. When control is instructed with respect to the plurality of signal processing units, the control information associated with the instruction information by the correspondence information is transmitted to the plurality of signal processing units via the signal line.

According to an embodiment of the present invention, there is provided a signal processing device which has a signal processing unit that processes an input signal inputted via a signal line with wide bandwidth, the signal processing unit being controlled by a control unit via a control line with narrow bandwidth or the signal line, including: receiving means for receiving control information related to all of a plurality of the signal processing units including a signal processing unit of another signal processing device, among pieces of control information necessary for executing content of control which are transmitted from the control unit via the signal line; and executing means for executing content of control on the signal processing unit on the basis of the control information.

The signal processing device may further include determining means for determining whether or not a signal transmitted via the signal line is a control signal containing the control information, and if it is determined that the signal transmitted via the signal line is the control signal, the executing means may execute the content of control on the signal processing unit on the basis of the control information.

The control information may indicate content of a change to a function of the signal processing unit, and the executing means may change the function of the signal processing unit on the basis of the control information.

According to an embodiment of the present invention, there is provided a signal processing method for a signal processing device that has a signal processing unit that processes an input signal inputted via a signal line with wide bandwidth, the signal processing unit being controlled by a control unit via a control line with narrow bandwidth or the signal line, including the steps of: receiving control information related to all of a plurality of the signal processing units including a signal processing unit of another signal processing device, among pieces of control information necessary for executing content of control which are transmitted from the control unit via the signal line; and executing content of control on the signal processing unit on the basis of the control information.

According to an embodiment of the present invention, there is provided a program for causing a computer to execute a process of controlling a signal processing device having a signal processing unit that processes an input signal inputted via a signal line with wide bandwidth, the signal processing unit being controlled by a control unit via a control line with narrow bandwidth or the signal line, the process including the steps of: receiving control information related to all of a plurality of the signal processing units including a signal processing unit of another signal processing device, among pieces of control information necessary for executing content of control which are transmitted from the control unit via the signal line; and executing content of control on the signal processing unit on the basis of the control information.

According to the above-mentioned embodiments of the present invention, among pieces of control information necessary for executing content of control which are transmitted from the control unit via the signal line, control information related to all of a plurality of the signal processing units including a signal processing unit of another signal processing device is received, and content of control on the signal processing unit is executed on the basis of the control information.

According to an embodiment of the present invention, there is provided a signal processing system including: a plurality of signal processing devices that process an input signal inputted via a signal line with wide bandwidth; and a control device that controls the plurality of signal processing devices via a control line with narrow bandwidth or the signal line. The control device includes storing means for storing correspondence information that associates instruction information indicating an instruction of control with respect to each of the signal processing devices, with control information related to all of the plurality of signal processing devices, among pieces of control information necessary for each of the signal processing devices to execute content of control, and transmitting means for transmitting the control information associated with the instruction information by the correspondence information, to the plurality of signal processing devices via the signal line, when control is instructed with respect to the plurality of signal processing devices. Each of the signal processing devices includes receiving means for receiving the control information transmitted from the control device via the signal line, and executing means for executing content of control on the basis of the control information.

According to the above-mentioned embodiment of the present invention, correspondence information is stored. The correspondence information associates instruction information indicating an instruction of control with respect to each of the signal processing devices, with control information having a large volume among pieces of control information necessary for each of the signal processing devices to execute content of control. When control is instructed with respect to the plurality of signal processing devices, the control information associated with the instruction information by the correspondence information is transmitted to the plurality of signal processing devices via the signal line, the control information transmitted from the control device via the signal line is received, and content of control is executed on the basis of the control information.

BRIEF DESCRIPTION OF THE DRAWINGS

FIG. 11 is a diagram showing an example of a communication-path determination table;

FIG. 17 is a diagram showing an example of a communication-path determination table;

DESCRIPTION OF THE PREFERRED EMBODIMENTS

Hereinbelow, embodiments of the present invention will be described with reference to the drawings.

Figure 1:
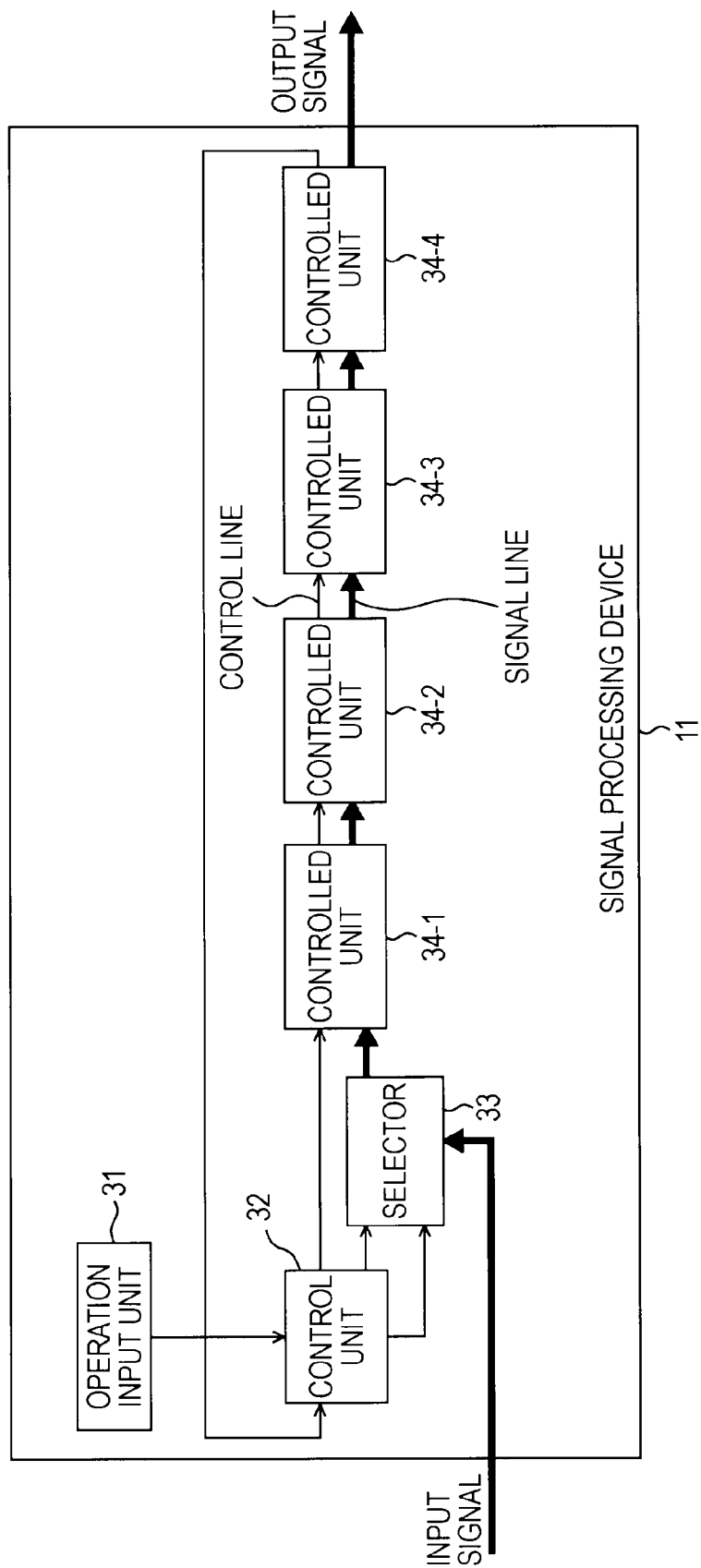
FIG. 1 is a diagram showing a configuration example of a signal processing device according to an embodiment of the present invention.

FIG. 1 is a diagram showing a configuration example of a signal processing device according to an embodiment of the present invention.

A signal processing device 11 in FIG. 1 applies predetermined signal processing to an input signal such as a video signal or an audio signal, and outputs the resulting output signal to a video display device or an audio output device (not shown). Also, the signal processing device 11 controls changes to the function of the whole of the signal processing device 11, or changes to some of the settings of the signal processing device 11.

The signal processing device 11 in FIG. 1 includes an operation input unit 31, a control unit 32, a selector 33, and controlled units 34-1 through 34-4.

In the signal processing device 11 in FIG. 1, the controlled units 34-1 through 34-4 are connected to each other in a daisy chain by a control line with narrow bandwidth which is indicated by a thin line in the drawing, and by a signal line with wide bandwidth which is indicated by a thick line.

The operation input unit 31 is configured by, for example, various kinds of operation button or dial. When an instruction to the signal processing device 11 is inputted, the operation input unit 31 is operated by the user, generates an operation signal corresponding to the content of the operation, and supplies the operation signal to the control unit 32.

More specifically, for example, when an instruction to change the function of the whole of the signal processing device 11 or to change some of the settings of the signal processing device 11 is made to the signal processing device 11, the operation input unit 31 is operated by the user, generates an operation signal corresponding to the content of the operation, and supplies the operation signal to the control unit 32.

The control unit 32 controls the whole or part of the operation of the signal processing device 11 via the control line. For example, in accordance with an operation signal from the operation input unit 31, the control unit 32 supplies operation instructing information for instructing an operation to the controlled units 34-1 through 34-4 via the control line, thus causing predetermined signal processing to be performed on an input signal inputted via the signal line.

Also, the control unit 32 controls the controlled units 34-1 through 34-4 serving as signal processing units via the control line or the signal line. In this regard, the term control refers to, for example, updating of the function of the controlled units 34-1 through 34-4, or changing of an operating parameter used for the operation of each controlled unit 34-1 through 34-4, and will be used to convey the same meaning in the following description.

For example, in accordance with an operation signal from the operation input unit 31, the control unit 32 supplies (transmits) control information for executing the content of control to all or some of the controlled units 34-1 through 34-4, via the control line.

Also, for example, in accordance with an operation signal from the operation input unit 31, the control unit 32 supplies to the selector 33 an instruction to switch the communication path used when controlling all or some of the controlled units 34-1 through 34-4. Then, the control unit 32 transmits control information for executing the content of control to all or some of the controlled units 34-1 through 34-4, via the selector 33 and the signal line.

For example, a destination ID (Identification) indicating the destination of a transmission is appended to the control information transmitted by the control unit 32. The controlled units 34-1 through 34-4 each acquire (receive) control information to which a destination ID matching its own device ID is appended.

The selector 33 switches the signal line from an input-signal communication path to a control-signal communication path, on the basis of the instruction to switch the communication path which is supplied from the control unit 32.

The controlled units 34-1 through 34-4 each perform updating of its own function, changing of an operating parameter, and the like in addition to applying predetermined signal processing to an input signal inputted to the signal processing device 11, under the control of the control unit 32.

When it is not necessary to differentiate between the controlled units 34-1 through 34-4, the controlled units 34-1 through 34-4 will be referred to simply as controlled unit 34. Other similar components will be referred to as similarly.

The controlled unit 34 may not necessarily be made up of four controlled units 34 as shown in FIG. 1, but may be made up of any other number of controlled units 34 greater than one.

Next, referring to FIG. 2, a specific configuration example of the control unit 32 will be described.

Figure 2:
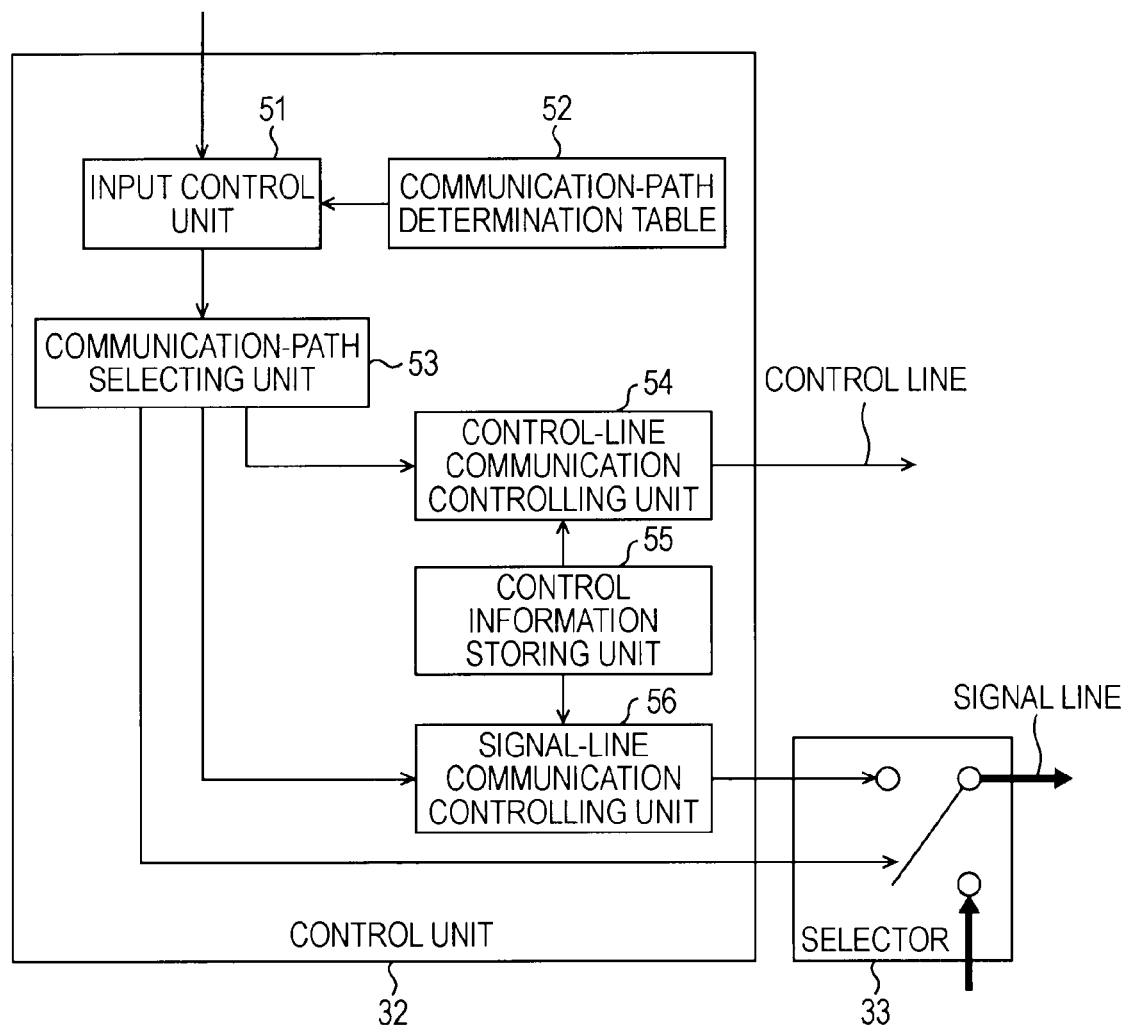
FIG. 2 is a diagram showing a configuration example of a control unit of the signal processing device shown in FIG. 1.

The control unit 32 in FIG. 2 includes an input control unit 51, a communication-path determination table 52, a communication-path selecting unit 53, a control-line communication controlling unit 54, a control information storing unit 55, and a signal-line communication controlling unit 56.

The input control unit 51 determines whether or not a command code, which is contained in an operation signal from the operation input unit 31 and corresponds to a user's operation (command) with respect to the signal processing device 11, has been inputted. Also, the input control unit 51 determines whether or not control content information, which corresponds to the inputted command code and indicates the content of control on the signal processing device 11, is stored in the communication-path determination table 52, and supplies the determination result to the communication-path selecting unit 53.

The communication-path determination table 52 stores command codes corresponding to user's operations (commands) on the signal processing device 11, and control content information in association with each other.

The content of control indicated by the control content information stored in the communication-path determination table 52 is, for example, the content of a change to the function of the whole of the signal processing device 11 (whole of the plurality of controlled units 34), such as a firmware update. Also, the volume of control information transmitted to each controlled unit 34 to execute the content of control indicated by the control content information is such that the control information should be transmitted via the signal line with a wider bandwidth than that of the control line. That is, the control content information stored in the communication-path determination table 52 corresponds to the content of control executed on the basis of control information transmitted via the signal line.

The communication-path selecting unit 53 selects the communication path over which control information is to be transmitted to the controlled unit 34, on the basis of the determination result from the input control unit 51.

Specifically, if it is determined by the input control unit 51 that control content information corresponding to an inputted command code is stored in the communication-path determination table 52, control information corresponding to that control content information is one that should be supplied via the signal line. Accordingly, in such a case, the communication-path selecting unit 53 supplies to the selector 33 an instruction to switch the signal line to a control-signal communication path. Also, the communication-path selecting unit 53 supplies the command code to the signal-line communication controlling unit 56.

If it is determined by the input control unit 51 that control content information corresponding to the inputted command code is not stored in the communication-path determination table 52, control information corresponding to that control content information is not one that should be supplied via the signal line (the control information is of a volume that can be sufficiently handled by the bandwidth of the control line). Accordingly, in such a case, the communication-path selecting unit 53 supplies to the selector 33 an instruction to keep the signal line as it is as an input-signal communication path. Also, the communication-path selecting unit 53 supplies the command code to the control-line communication controlling unit 56.

The control-line communication controlling unit 54 reads, on the basis of the command code supplied from the communication-path selecting unit 53, corresponding control information from the control information storing unit 55, and transmits the control information to the controlled unit 34 as a control signal containing control information, via the control line.

The control information storing unit 55 stores control information that is information used for the controlled unit 34 to execute updating of a function, changing of an operating parameter, and the like, in association with command codes.

For example, since control information for executing updating of a function is supplied to each controlled unit 34, and affects the whole of the function of the controlled unit 34, its information volume becomes large. Also, since control information for executing changing of an operating parameter is supplied to only part of the controlled unit 34, and merely indicates a difference from the default value of an existing operating parameter, its information volume is small.

The signal-line communication controlling unit 56 reads, on the basis of the command code supplied from the communication-path selecting unit 53, corresponding control information from the control information storing unit 55, supplies the control information to the selector 33, and transmits the control information to the controlled unit 34 as a control signal containing control information, via the signal line.

Next, referring to FIG. 3, a specific configuration example of the controlled unit 34 will be described.

Figure 3:
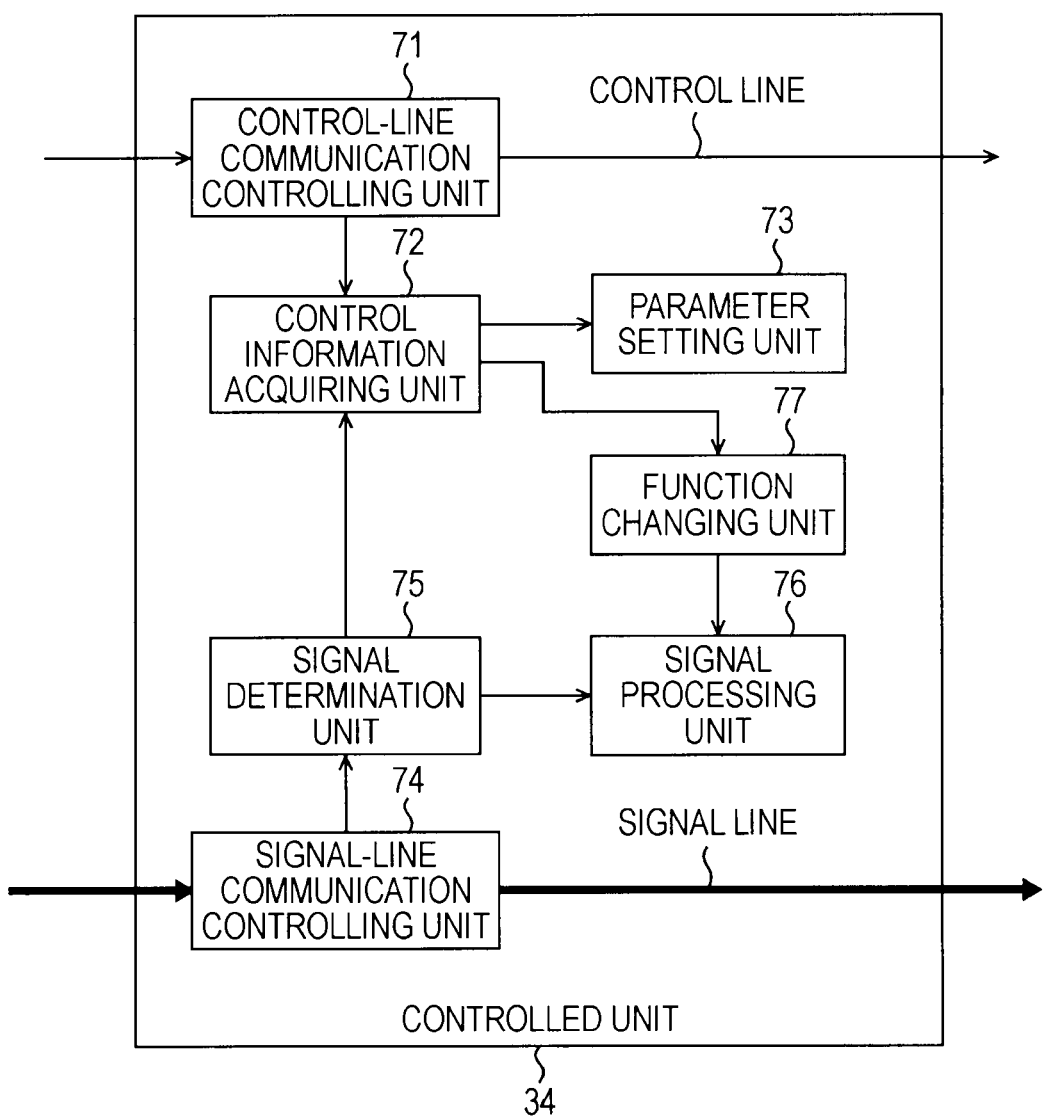
FIG. 3 is a diagram showing a configuration example of a controlled unit of the signal processing device shown in FIG. 1.

The controlled unit 34 in FIG. 3 includes a control-line communication controlling unit 71, a control information acquiring unit 72, a parameter setting unit 73, a signal-line communication controlling unit 74, a signal determination unit 75, a signal processing unit 76, and a function changing unit 77.

The signal-line communication controlling unit 71 controls the reception of a control signal transmitted from the control unit 32 via the control line. For example, the control-line communication controlling unit 71 controls the reception of a control signal that contains control information to which a destination ID matching its own device ID is appended, among pieces of control information transmitted from the control unit 32.

The control information acquiring unit 72 acquires control information from the control-line communication controlling unit 71 or the signal determination unit 75, determines the use of the control information within the controlled unit 34, and supplies the control information to the parameter setting unit 73 or the functional changing unit 77 in accordance with the use.

The parameter setting unit 73 sets (changes) an operating parameter within the controlled unit 34, on the basis of the control information supplied from the control information acquiring unit 72.

The signal-line communication controlling unit 74 controls the transmission and reception of an input signal transmitted via the signal line, or the reception of a control signal transmitted from the control unit 32. For example, the signal-line communication controlling unit 74 controls the reception of a control signal that contains control information to which a destination ID matching its own device ID is appended, among pieces of control information transmitted from the control unit 32.

The signal determination unit 75 determines whether or not a signal received by the signal-line communication controlling unit 74 is an input signal or a control signal. If the signal received by the signal-line communication controlling unit 74 is an input signal, the signal determination unit 75 acquires the input signal from the signal-line communication controlling unit 74, and supplies the input signal to the signal processing unit 76. If the signal received by the signal-line communication controlling unit 74 is a control signal, the signal determination unit 75 acquires the control signal from the signal-line communication controlling unit 74, and causes control information contained in the control signal to be acquired by the control information acquiring unit 72.

The signal processing unit 76 applies predetermined signal processing to an input signal supplied from the signal determination unit 75, and supplies the input signal to the signal-line communication controlling unit 74.

The function changing unit 77 changes the function of the signal processing unit 76 on the basis of control information supplied from the control information acquiring unit 72.

Next, referring to the flowcharts in FIGS. 4 and 5, a description will be given of a communication-path selecting process in the control unit 32 in FIG. 2, and a control content executing process in the controlled unit 34 in FIG. 3.

Figure 4:
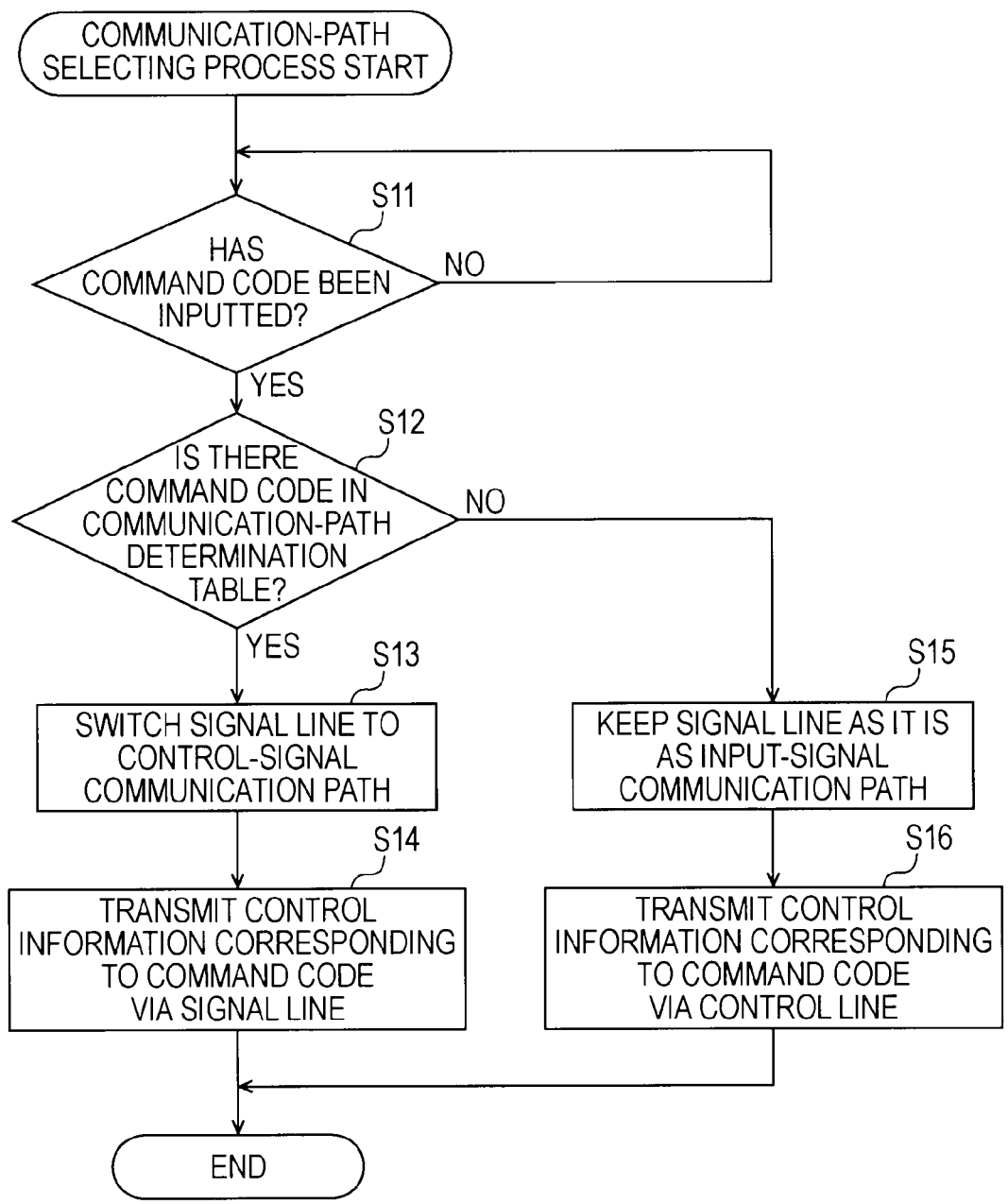
FIG. 4 is a flowchart illustrating a communication-path selecting process in the control unit of the signal processing device shown in FIG. 1.

In step S11 in the flowchart in FIG. 4, the input control unit 51 of the control unit 32 determines whether or not a command code, which is contained in an operation signal from the operation input unit 31 and corresponds to a user's operation (command) on the signal processing device 11, has been inputted.

If it is determined in step S11 that the command code has been inputted, the processing proceeds to step S12, where the input control unit 51 determines whether or not control content information corresponding to the inputted command code is stored in the communication-path determination table 52.

If it is determined in step S12 that control content information corresponding to the command code is stored in the communication-path determination table 52, the input control unit 51 supplies to the communication-path selecting unit 53 a determination result indicating that control content information corresponding to the command code is stored in the communication-path determination table 52. Then, the processing proceeds to step S13.

In step S13, in accordance with the determination result from the input control unit 51, the communication-path selecting unit 53 supplies to the selector 33 an instruction to switch the signal line to a control-signal communication path. Also, the communication-path selecting unit 53 supplies the command code to the signal-line communication controlling unit 56.

For example, control information necessary for updating firmware stored in each controlled unit 34 concerns each controlled unit 34, so its information volume is large. That is, control content information corresponding to the control information necessary for the update is stored in the communication-path determination table 52. Accordingly, when a command code instructing that firmware stored in each controlled unit 34 be updated is inputted by a user's operation (command), the input control unit 51 supplies to the communication-path selecting unit 53 a determination result indicating that control content information corresponding to the command code is stored in the communication-path determination table 52. In accordance with the determination result from the input control unit 51, the communication-path selecting unit 53 causes the selector 33 to switch the signal line to a control-signal communication path. Also, the communication-path selecting unit 53 supplies to the signal-line communication controlling unit 56 a command code instructing that firmware stored in each controlled unit 34 be updated.

In step S14, on the basis of the command code supplied from the communication-path selecting unit 53, the signal-line communication path controlling unit 56 reads corresponding control information from the control information storing unit 55, supplies the control information to the selector 33, and transmits the control information to the controlled unit 34 as a control signal containing control information, via the signal line. Appended to the control information transmitted by the signal-line communication controlling unit 56 at this time are, for example, destination IDs respectively indicating the controlled units 34-1 through 34-4 as the transmission destinations.

For example, on the basis of the command code supplied from the communication-path selecting unit 53, the signal-line communication controlling unit 56 reads from the control information storing unit 55 control information necessary for updating firmware stored in each controlled unit 34, and supplies the control information to the selector 33. In the selector 33, since the signal line has been switched to a control-signal communication path, the control information necessary for updating firmware stored in each controlled unit 34 is transmitted to each controlled unit 34 via the signal line.

At this time, the control-line communication controlling unit 54 may transmit a signal to each controlled unit 34 via the control line to the effect that control information will be transmitted via the signal line. Thus, the controlled unit 34 can transition to a mode that allows reception of control information via the signal line.

Since the signal line has been switched to a control-signal communication path due to the operation of the selector 33 in this way, an input signal is not inputted, nor signal processing be executed with respect to an input signal in each controlled unit 34. However, the time when a control signal is transmitted via the signal line is when a function update that affects the whole of the signal processing device 11 is executed, and performing signal processing on an input signal while executing such a function update more or less adversely affects the output signal. Accordingly, it suffices that the input signal be inputted after the function update, and it is not necessary for the input signal to be inputted while the signal line serves as a control-signal communication path.

Figure 5:
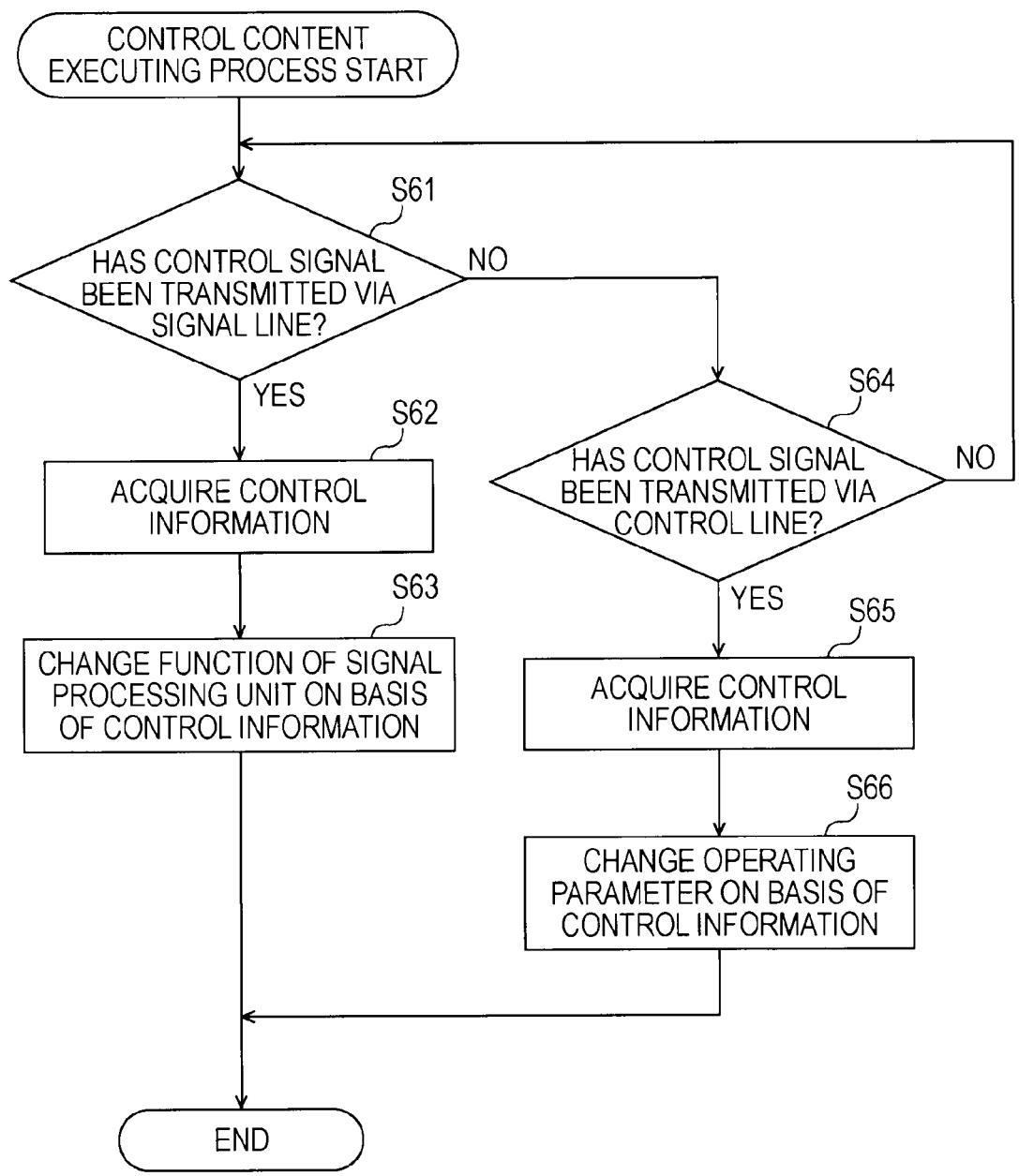
FIG. 5 is a flowchart illustrating a control content executing process in the controlled unit of the signal processing device shown in FIG. 1.

After the process in step S14 in the flowchart of FIG. 4, in step S61 in the flowchart of FIG. 5, the signal determination unit 75 of the controlled unit 34 determines whether or not a control signal has been transmitted via the signal line. More specifically, the signal determination unit 75 determines whether or not a signal received by the signal-line communication controlling unit 74 is a control signal containing control information to which a destination ID matching its own device ID is appended.

In this case, it is determined in step S61 that a control signal has been transmitted via the signal line, and the signal determination unit 75 acquires the control signal from the signal-line communication controlling unit 74. Then, the processing proceeds to step S62.

At this time, the control-line communication controlling unit 71 may transition to a mode that allows reception of control information via the signal line, by receiving a signal transmitted from the control unit 32 via the control line and indicating that control information be transmitted via the signal line.

In step S62, the control information acquiring unit 72 acquires control information from the control signal acquired by the signal determination unit 75, and supplies the control information to the function changing unit 77.

In step S63, the function changing unit 77 changes the function of the signal processing unit 76 on the basis of the control information supplied from the control information acquiring unit 72.

For example, when a control signal containing control information necessary for updating firmware stored in the signal processing unit 76 of each controlled unit 34 is transmitted via the signal line, the signal determination unit 75 acquires the control signal from the signal-line communication controlling unit 74. The control information acquiring unit 72 acquires control information from the control signal, and supplies the control information to the function changing unit 77. The function updating unit 77 updates the firmware stored in the signal processing unit 76 on the basis of the control information supplied from the control information acquiring unit 72.

On the other hand, if it is determined in step S12 in the flowchart of FIG. 4 that control content information corresponding to a command code is not stored in the communication-path determination table 52, the input control unit 51 supplies to the communication-path selecting unit 53 a determination result indicating that control content information corresponding to the command code is not stored in the communication-path determination table 52, and the processing proceeds to step S15.

In step S15, in accordance with the determination result from the input control unit 51, the communication-path selecting unit 53 supplies to the selector 33 an instruction to the effect that the signal line be kept as it is as an input-signal communication path. Also, the communication-path selecting unit 53 supplies the command code to the control-line communication controlling unit 54.

For example, control information necessary for changing an operating parameter of part of the controlled unit 34 concerns only part of the controlled unit 34, and its information volume is small. That is, control content information corresponding to the control information necessary for changing the operating parameter is not stored in the communication-path determination table 52. Accordingly, when a command code instructing that an operating parameter of part of the controlled unit 34 be changed is inputted by a user's operation (command), the input control unit 51 supplies to the communication-path selecting unit 53 a determination result indicating that control content information corresponding to the command code is not stored in the communication-path determination table 52. In accordance with the determination result from the input control unit 51, the communication-path selecting unit 53 causes the selector 33 to keep the signal line as it is as an input-signal communication path. Also, the communication-path selecting unit 53 supplies to the control-line communication controlling unit 54 a command code instructing that an operating parameter of part of the controlled unit 34 be changed.

In step S16, on the basis of the command code supplied from the communication-path selecting unit 53, the control-line communication controlling unit 54 reads corresponding control information from the control information storing unit 55, supplies the control information to the selector 33, and transmits the control information to the controlled unit 34 via the control line. Appended to the control information transmitted by the control-line control unit 54 at this time is, for example, a destination ID indicating the controlled unit 34-2 as the transmission destination.

For example, on the basis of the command code supplied from the communication-path selecting unit 53, the control-line communication controlling unit 54 reads from the control information storing unit 55 control information necessary for changing an operating parameter of part of the controlled unit 34, and supplies the control information to the selector 33. In the selector 33, since the signal line is kept as it is as an input-signal communication path, control information necessary for changing an operating parameter of the controlled unit 34-2 is transmitted to the controlled unit 34-2, via the control line.

Since the signal line is kept as it is as an input-signal communication path due to the operation of the selector 33 in this way, an input signal is inputted, and signal processing in each controlled unit 34 is executed. The time when a control signal is transmitted via the control line is when changing or the like of an operating parameter that affects a part of the signal processing unit 11 is executed. Such changing or the like of an operating parameter is to be executed after performing signal processing on the input signal, and does not affect the output signal. Therefore, while the control line serves as a control-signal communication path, there is no problem in inputting the input signal.

After the process of step S16 in the flowchart of FIG. 4, it is determined in step S61 in the flowchart of FIG. 5 that the control signal has not been supplied from the signal line, and the processing proceeds to step S64.

In step S64, the control-line communication controlling unit 71 determines whether or not a control signal containing control information to which a destination ID matching its own device ID is appended has been transmitted via the control line.

If it is determined in step S64 that the control signal has been transmitted via the control line, the processing proceeds to step S65, where the control information acquiring unit 72 acquires from the control signal the control information to which a destination ID matching its own device ID is appended, and supplies the control information to the parameter setting unit 73. Then, the processing proceeds to step S66.

In step S66, the parameter setting unit 73 sets (changes) an operating parameter within the controlled unit 34, on the basis of the control information supplied from the control information acquiring unit 72.

For example, when a control signal containing control information necessary for changing an operating parameter of the signal processing unit 76 of the controlled unit 34 has been transmitted via the control line, the control information acquiring unit 72 acquires the control information from the control signal, and supplies the control information to the parameter setting unit 73. The parameter setting unit 73 changes the operating parameter of the signal processing unit 76 on the basis of the control information supplied from the control information acquiring unit 72.

If it is determined in step S11 in the flowchart of FIG. 4 that the command code has not been inputted, the process of step S11 is repeated until it is determined that the command code has been inputted.

Further, if it is determined in step S64 in the flowchart of FIG. 5 that the control signal has not been transmitted via the signal line, the processing returns to step S61, and the processes of step S61 and step S64 are repeated until the control signal is transmitted via the signal line or the control line.

Through the above-mentioned processing, the control unit 32 can select a communication path over which control information is to be transmitted, in accordance with the command code. The controlled unit 34 can execute the content of control on the basis of the control information that has been transmitted via the control line or the signal line.

As a result, in a case where the volume of control information is large, the control unit 32 can transmit the control signal to the controlled unit 34 via the signal line with wide bandwidth, and the controlled unit 34 can change the function of the signal processing unit 76 on the basis of the control information. Also, in a case where the volume of control information is small, the control unit 32 can transmit the control signal to the controlled unit 34 via the control line with narrow bandwidth, and the controlled unit 34 can set an operating parameter of the signal processing unit 76 on the basis of the control information. Therefore, the load on the communication path can be stabilized, which allows the controlled unit 34 to be controlled in a stable manner even when the number of the controlled units 34 increases.

Since the controlled unit 34 is connected in a daisy chain, even if the number of the controlled units 34 increases, it is possible to avoid the problem in which the transmission characteristics of a bus deteriorate when the number of connections increases in the case of bus connection, thereby achieving stable control of the controlled unit 34.

In the flowchart in FIG. 5, steps S62 and S63, and steps S65 and S66 can be also processed in a parallel fashion.

While the foregoing is directed to the signal processing device that applies predetermined signal processing to an input signal and outputs an output signal, the above-described configuration can be also applied to, for example, a video processing device that processes a video signal.

Figure 6:
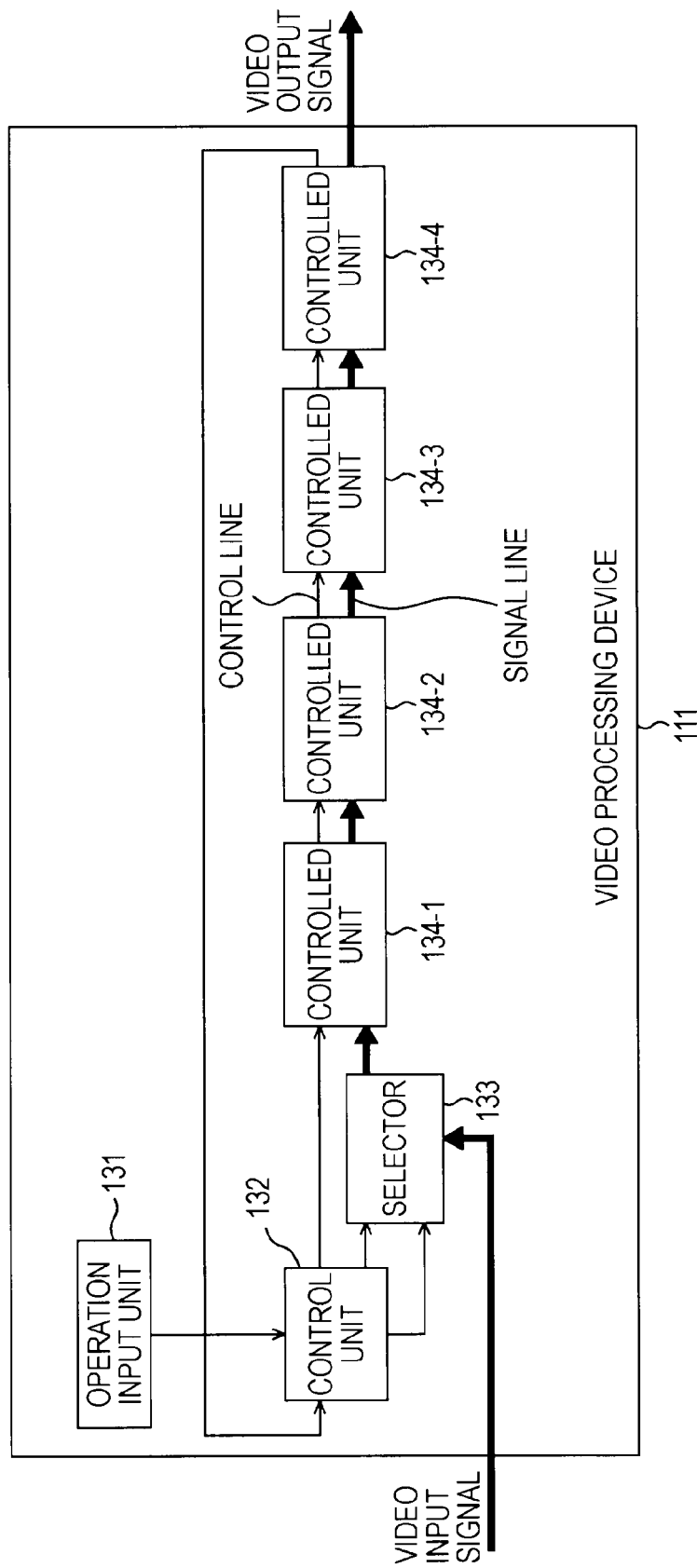
FIG. 6 is a diagram showing a configuration example of a video processing device according to an embodiment of the present invention.

FIG. 6 shows a configuration example of a video processing device according to an embodiment of the present invention.

A video processing device 111 in FIG. 6 applies predetermined video signal processing to a video input signal, and outputs the resulting video output signal to a video display device (not shown). Also, on the basis of a user's operation, the video processing device 111 controls changes to the function of the whole of the video processing device 111, or changes to some of the settings of the video processing device 111.

The video processing device 111 in FIG. 6 includes an operation input unit 131, a control unit 132, a selector 133, and controlled units 134-1 through 134-4.

In FIG. 6, the operation input unit 131, the control unit 132, the selector 133, and the controlled units 134-1 through 134-4 respectively correspond to the operation input unit 31, the control unit 32, the selector 33, and the controlled units 34-1 through 34-4 in FIG. 1. That is, the video processing device 111 in FIG. 6 has basically the same configuration as that of the signal processing device 11 in FIG. 1, except that processing is performed with respect to a video signal. Thus, description of the video signal processing device 111 is omitted.

Figure 7:
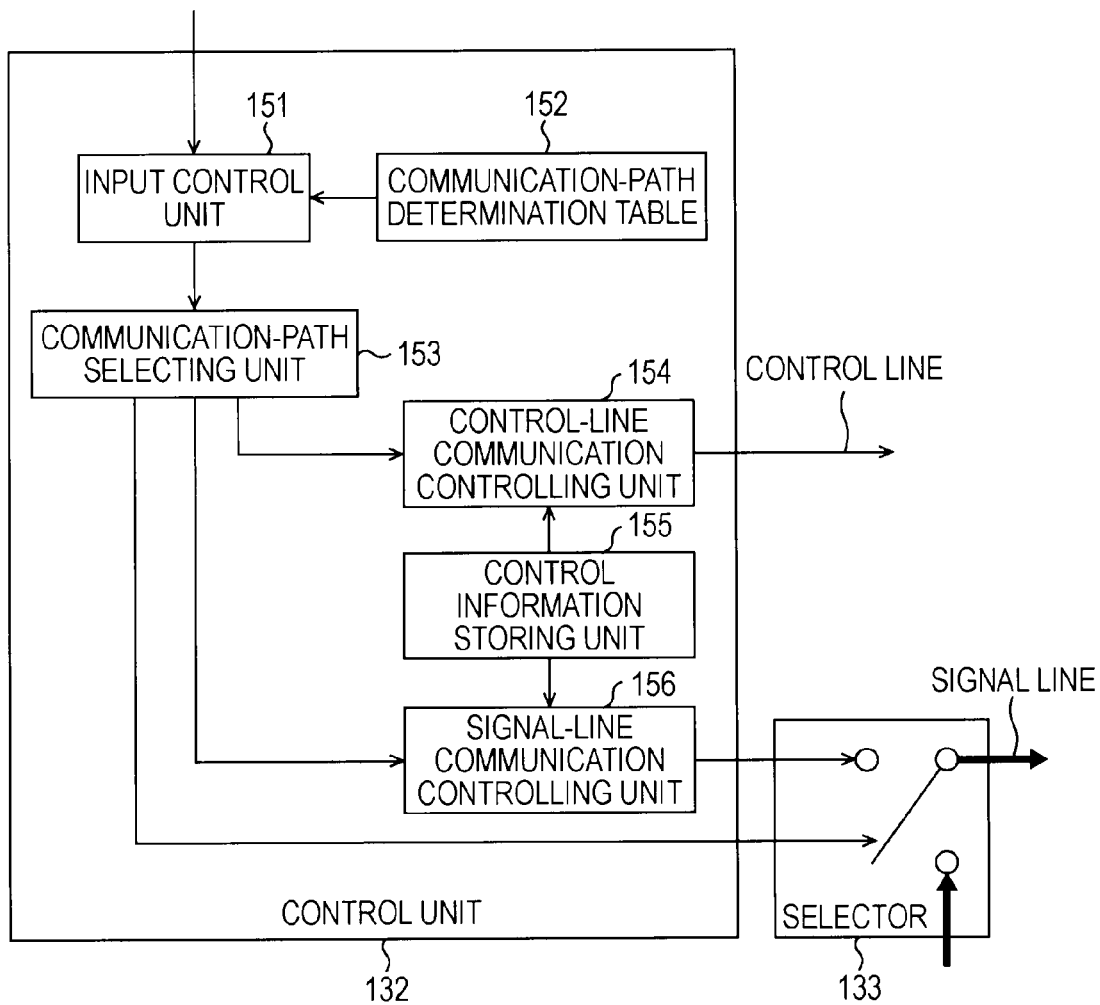
FIG. 7 is a diagram showing a configuration example of a control unit of the video processing device shown in FIG. 6.

FIG. 7 shows a specific configuration example of the control unit 132 in FIG. 6.

The control unit 132 in FIG. 7 includes an input control unit 151, a communication-path determination table 152, a communication-path selecting unit 153, a control-line communication controlling unit 154, a control information storing unit 155, and a signal-line communication controlling unit 156.

In FIG. 7, the input control unit 151, the communication-path determination table 152, the communication-path selecting unit 153, the control-line communication controlling unit 154, the control information storing unit 155, and the signal-line communication controlling unit 156 respectively correspond to the input control unit 51, the communication-path determination table 52, the communication-path selecting unit 53, the control-line communication controlling unit 54, the control information storing unit 55, and the signal-line communication controlling unit 56 in FIG. 2. That is, the control unit 132 in FIG. 7 has basically the same configuration as that of the control unit 32 in FIG. 2, except that the control unit 132 performs control with respect to the controlled unit 134 that processes a video signal. Thus, description of the control unit 132 is omitted.

Figure 8:
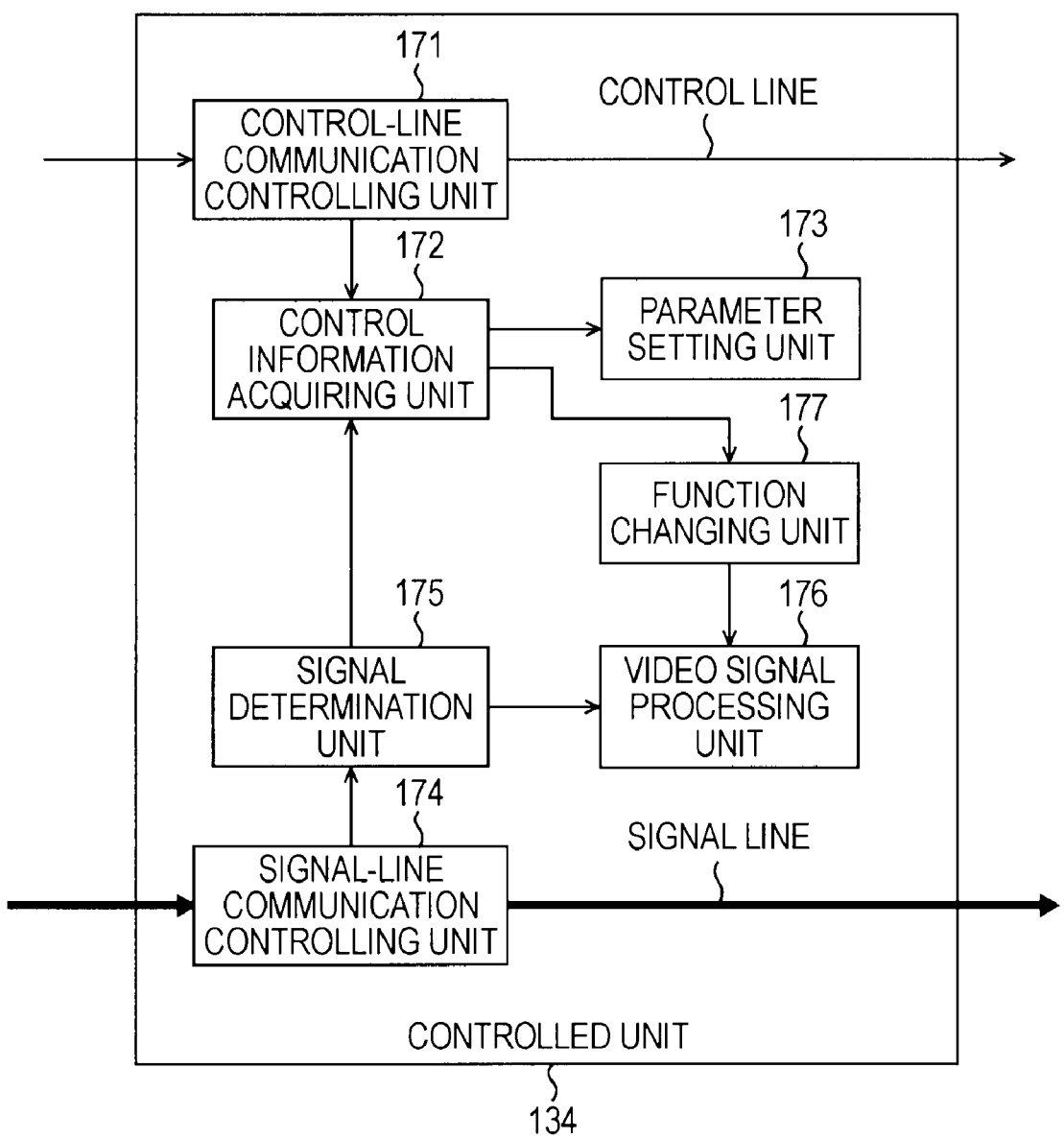
FIG. 8 is a diagram showing a configuration example of a controlled unit of the video processing device shown in FIG. 6.

FIG. 8 shows a specific configuration example of the controlled unit 134 in FIG. 6.

The controlled unit 134 in FIG. 8 includes a control-line communication controlling unit 171, a control information acquiring unit 172, a parameter setting unit 173, a signal-line communication controlling unit 174, a signal determination unit 175, a video signal processing unit 176, and a function changing unit 177.

In FIG. 8, the control-line communication controlling unit 171, the control information acquiring unit 172, the parameter setting unit 173, the signal-line communication controlling unit 174, the signal determination unit 175, the video signal processing unit 176, and the function changing unit 177 respectively correspond to the control-line communication controlling unit 71, the control information acquiring unit 72, the parameter setting unit 73, the signal-line communication controlling unit 74, the signal determination unit 75, the signal processing unit 76, and the function changing unit 77 in FIG. 3. That is, the controlled unit 134 in FIG. 8 has basically the same configuration as that of the controlled unit 34 in FIG. 3, except that the video signal processing unit 176 processes a video signal. Thus, description of the controlled unit 134 is omitted.

Next, referring to the flowcharts in FIGS. 9 and 10, a description will be given of a communication-path selecting process in the control unit 132 in FIG. 2, and a control content executing process in the controlled unit 134 in FIG. 8.

Figure 9:
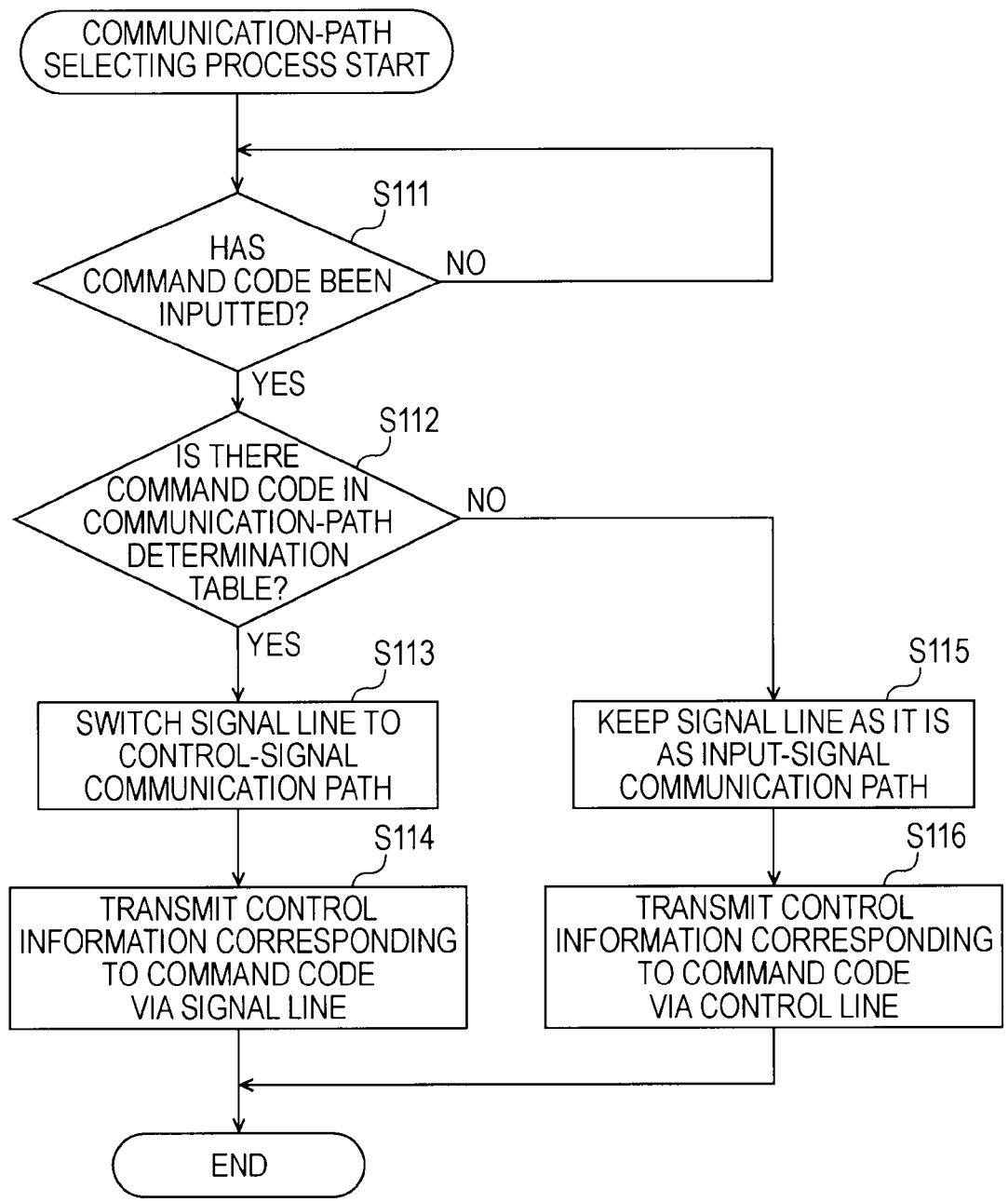
FIG. 9 is a flowchart illustrating a communication-path selecting process in the control unit of the video processing device shown in FIG. 6.

Since the processes of step S111 and steps S113 through S116 in the flowchart of FIG. 9 are basically the same as the processes of step S11 and steps S13 through S16 in the flowchart of FIG. 4, description thereof is omitted.

Figure 10:
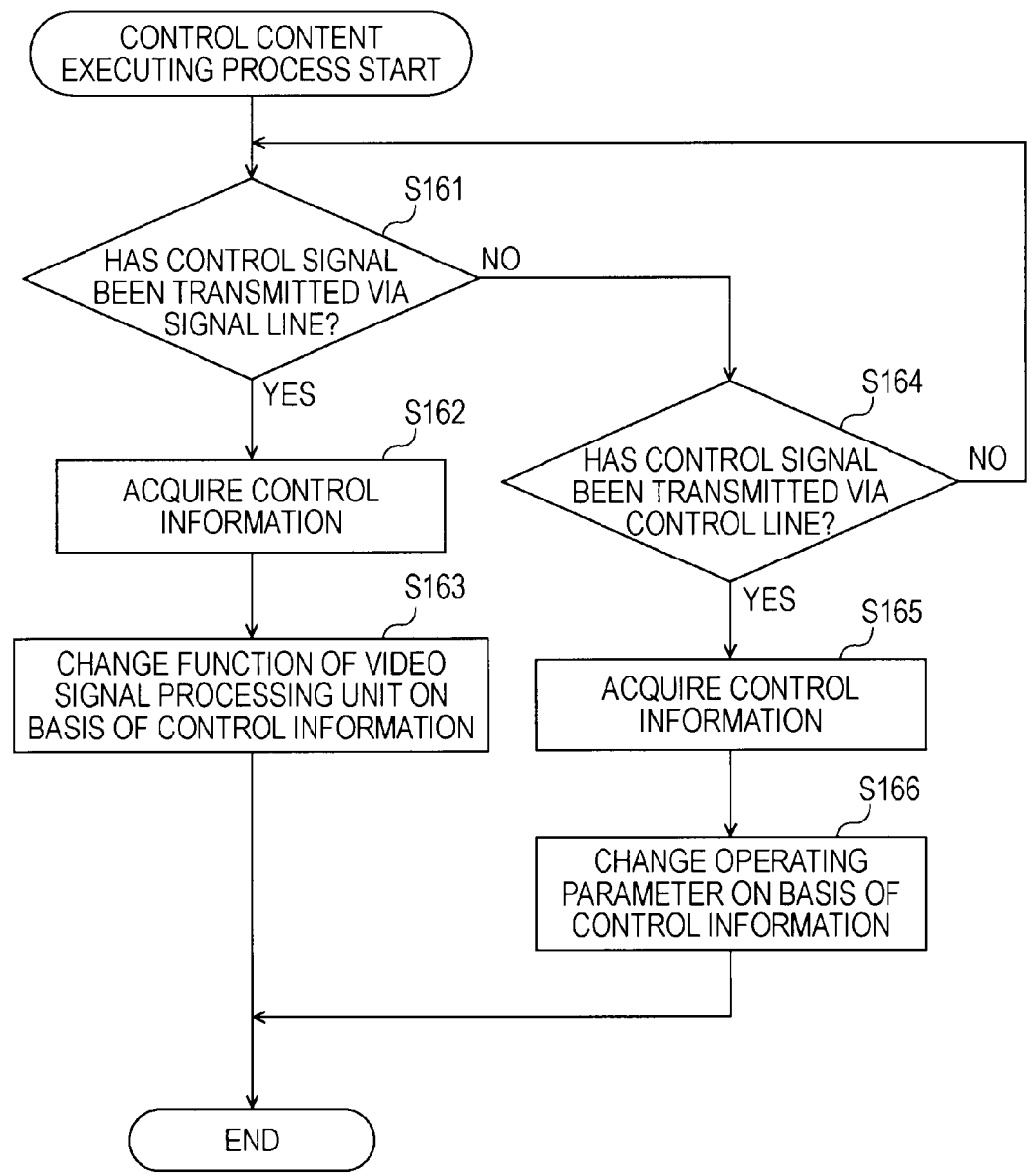
FIG. 10 is a flowchart illustrating a control content executing process in the controlled unit of the video processing device shown in FIG. 6.

Also, since the control content executing process in FIG. 10 is performed basically in the same manner as the control content executing process described above with reference to the flowchart of FIG. 5, description thereof is omitted.

In step S112 in the flowchart of FIG. 9, the input control unit 151 determines whether or not control content information corresponding to an inputted command code is stored in the communication-path determination table 152.

Now, referring to FIG. 11, a description will be given of the communication-path determination table 152, which is looked up by the input control unit 151 in step S112 in the flowchart of FIG. 9.

As shown in FIG. 11, the communication-path determination table 152 stores control content information "Change to 480i video format" corresponding to Command Code "0", and control content information "Change to 480p video format" corresponding to Command Code "10".

Also, the communication-path determination table 152 stores control content information "Change to 720p video format" corresponding to Command Code "20", and control content information "Change to 1080i video format" corresponding to Command Code "30".

Further, the communication-path determination table 152 stores control content information "Change to 1080p video format" corresponding to Command Code "40", and control content information "Change to WXGA (Wide XGA (extended graphics array)) video format" corresponding to Command Code "50".

Also, the communication-path determination table 152 stores control content information "Change to 42 Kp video format" corresponding to Command Code "60".

That is, according to the communication-path determination table 152 in FIG. 11, in the control unit 132, for example, when Command Code "40" is inputted by a user's operation (command), the input control unit 151 supplies to the communication-path selecting unit 153 a determination result indicating that the control content information "Change to 1080p video format" corresponding to Command Code "40" is stored in the communication-path determination table 152. The communication-path selecting unit 153 causes the selector 133 to switch the signal line to a control-signal communication path, and supplies Command Code "40" to the signal-line communication controlling unit 156. On the basis of the Command Code "40" supplied from the communication-path selecting unit 153, the signal-line communication controlling unit 156 reads from the control information storing unit 155 control information necessary for effecting a change to the 1080p video format, and supplies the control information to the selector 133. In the selector 133, since the signal line has been switched to a control-signal communication path, the control information necessary for effecting a change to the 1080p video format is transmitted to each controlled unit 134 as a control signal via the signal line.

On the other hand, in the controlled unit 134, when the control signal containing the control information necessary for effecting a change to the 1080p video format has been transmitted via the signal line, the signal determination unit 175 acquires the control signal from the signal-line communication controlling unit 174. The control information acquiring unit 172 acquires the control information from the control signal, and supplies the control information to the function changing unit 177. On the basis of the control information supplied from the control information acquiring unit 172, the function changing unit 177 changes the function of the video signal processing unit 176 so as to conform to the 1080p video format.

Also, in the control unit 132, for example, when Command Code "238" is inputted by a user's operation (command), the input control unit 151 supplies to the communication-path selecting unit 153 a determination result indicating that control content information corresponding to Command Code "238" is not stored in the communication-path determination table 152. The communication-path selecting unit 153 causes the selector 133 to keep the signal line as it is as an input-signal communication path, and supplies Command Code "238" to the control-line communication controlling unit 154. On the basis of Command Code "238" supplied from the communication-path selecting unit 153, the control-line communication controlling unit 154 reads from the control information storing unit 155 control information necessary for changing video brightness, and supplies the control information to the selector 133. In the selector 133, since the signal line is kept as it is as an input-signal communication path, the control information necessary for changing video brightness is transmitted to a predetermined one of the controlled units 134 via the control line.

On the other hand, in the controlled unit 134, when the control signal containing the control information necessary for changing video brightness has been transmitted via the control line, the control information acquiring unit 172 acquires the control information from the control signal, and supplies the control information to the parameter setting unit 173. On the basis of the control information supplied from the control information acquiring unit 172, the parameter setting unit 173 changes an operating parameter of the video signal processing unit 176, thereby changing video brightness.

Through the above-mentioned processing, the control unit 132 can select a communication path over which control information is to be transmitted, in accordance with the command code. The controlled unit 134 can execute the content of control on the basis of the control information that has been transmitted via the control line or the signal line.

As a result, in a case where the volume of control information is large, the control unit 132 can transmit the control signal to the controlled unit 134 via the signal line with wide bandwidth, and the controlled unit 134 can change the function of the video signal processing unit 176 on the basis of the control information. Also, in a case where the volume of control information is small, the control unit 132 can transmit the control signal to the controlled unit 134 via the control line with narrow bandwidth, and the controlled unit 134 can set an operating parameter of the video signal processing unit 176 on the basis of the control information. Therefore, the load on the communication path can be stabilized, which allows the controlled unit 134 to be controlled in a stable manner even when the number of the controlled units 134 increases.

While the foregoing description is directed to the video processing device that applies predetermined video signal processing to a video input signal and outputs a video output signal, the above-described configuration can be also applied to, for example, an audio processing device that processes an audio signal.

Figure 12:
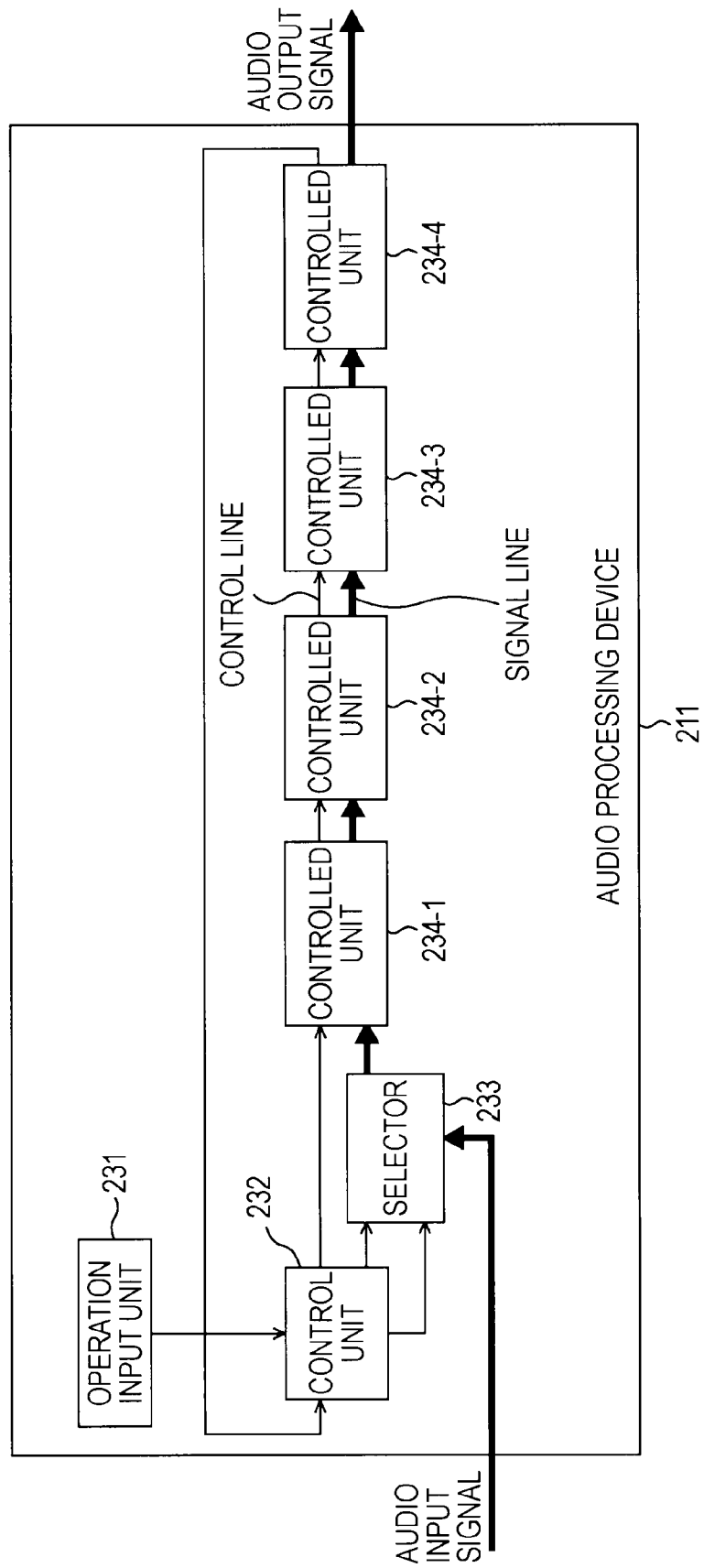
FIG. 12 is a diagram showing a configuration example of an audio processing device according to an embodiment of the present invention.

FIG. 12 shows a configuration example of an audio processing device according to an embodiment of the present invention.

An audio processing device 211 in FIG. 12 applies predetermined audio signal processing to an audio input signal, and outputs the resulting audio output signal to an audio output device (not shown). Also, on the basis of a user's operation, the audio processing device 211 controls changes to the function of the whole of the audio processing device 211, or changes to some of the settings of the audio processing device 2111.

The audio processing device 211 in FIG. 12 includes an operation input unit 231, a control unit 232, a selector 233, and controlled units 234-1 through 234-4.

In FIG. 12, the operation input unit 231, the control unit 232, the selector 233, and the controlled units 234-1 through 234-4 respectively correspond to the operation input unit 31, the control unit 32, the selector 33, and the controlled units 34-1 through 34-4 in FIG. 1. That is, the audio processing device 211 in FIG. 12 has basically the same configuration as that of the signal processing device 11 in FIG. 1, except that the audio processing device 211 performs processing with respect to an audio signal. Thus, description of the audio signal processing device 211 is omitted.

Figure 13:
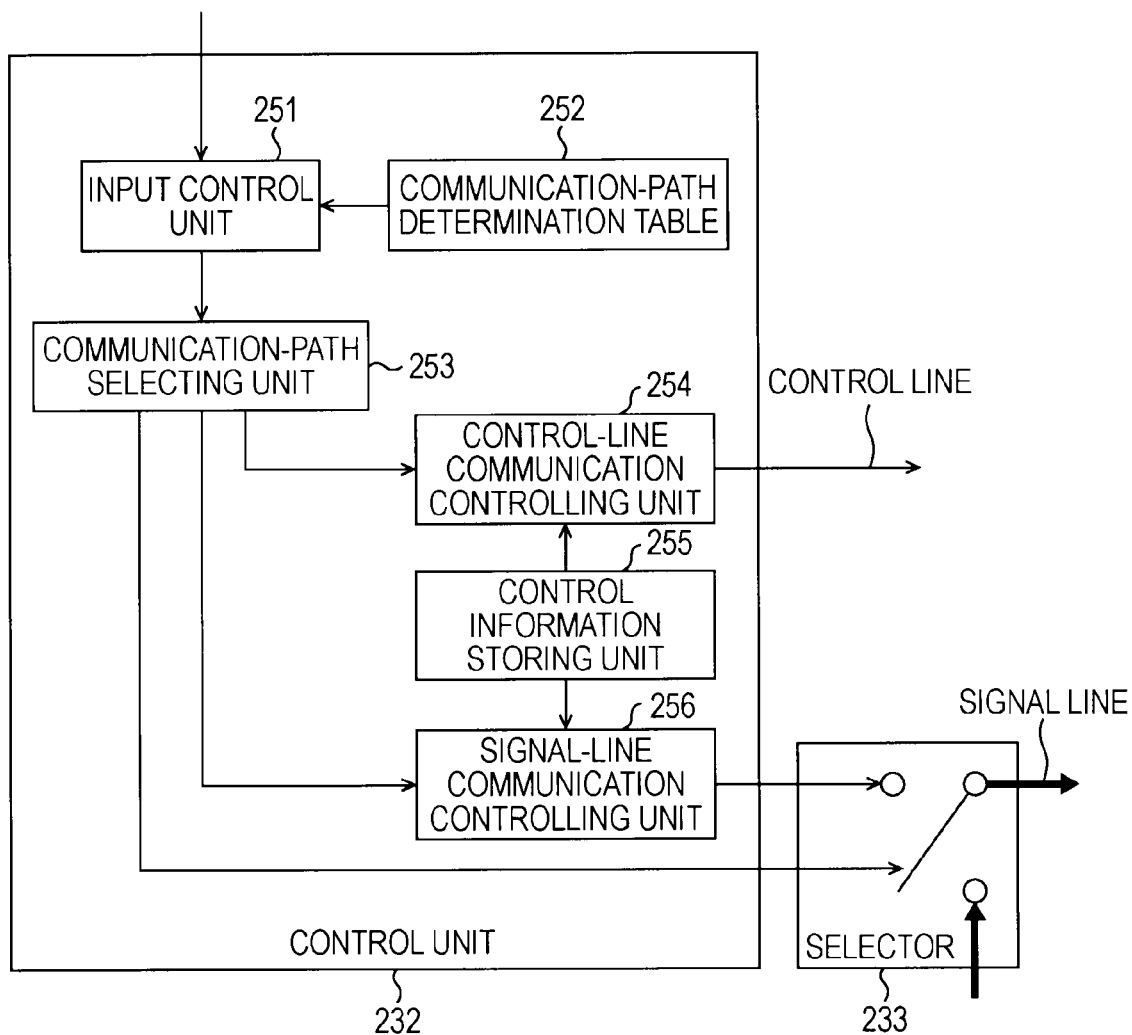
FIG. 13 is a diagram showing a configuration example of a control unit of the audio processing device shown in FIG. 12.

FIG. 13 shows a specific configuration example of the control unit 232 in FIG. 12.

The control unit 232 in FIG. 13 includes an input control unit 251, a communication-path determination table 252, a communication-path selecting unit 253, a control-line communication controlling unit 254, a control information storing unit 255, and a signal-line communication controlling unit 256.

In FIG. 13, the input control unit 251, the communication-path determination table 252, the communication-path selecting unit 253, the control-line communication controlling unit 254, the control information storing unit 255, and the signal-line communication controlling unit 256 respectively correspond to the input control unit 51, the communication-path determination table 52, the communication-path selecting unit 53, the control-line communication controlling unit 54, the control information storing unit 55, and the signal-line communication controlling unit 56 in FIG. 2. That is, the control unit 232 in FIG. 13 has basically the same configuration as that of the control unit 32 in FIG. 2, except that the control unit 232 performs control with respect to the controlled unit 234 that processes an audio signal. Thus, description of the control unit 232 is omitted.

Figure 14:
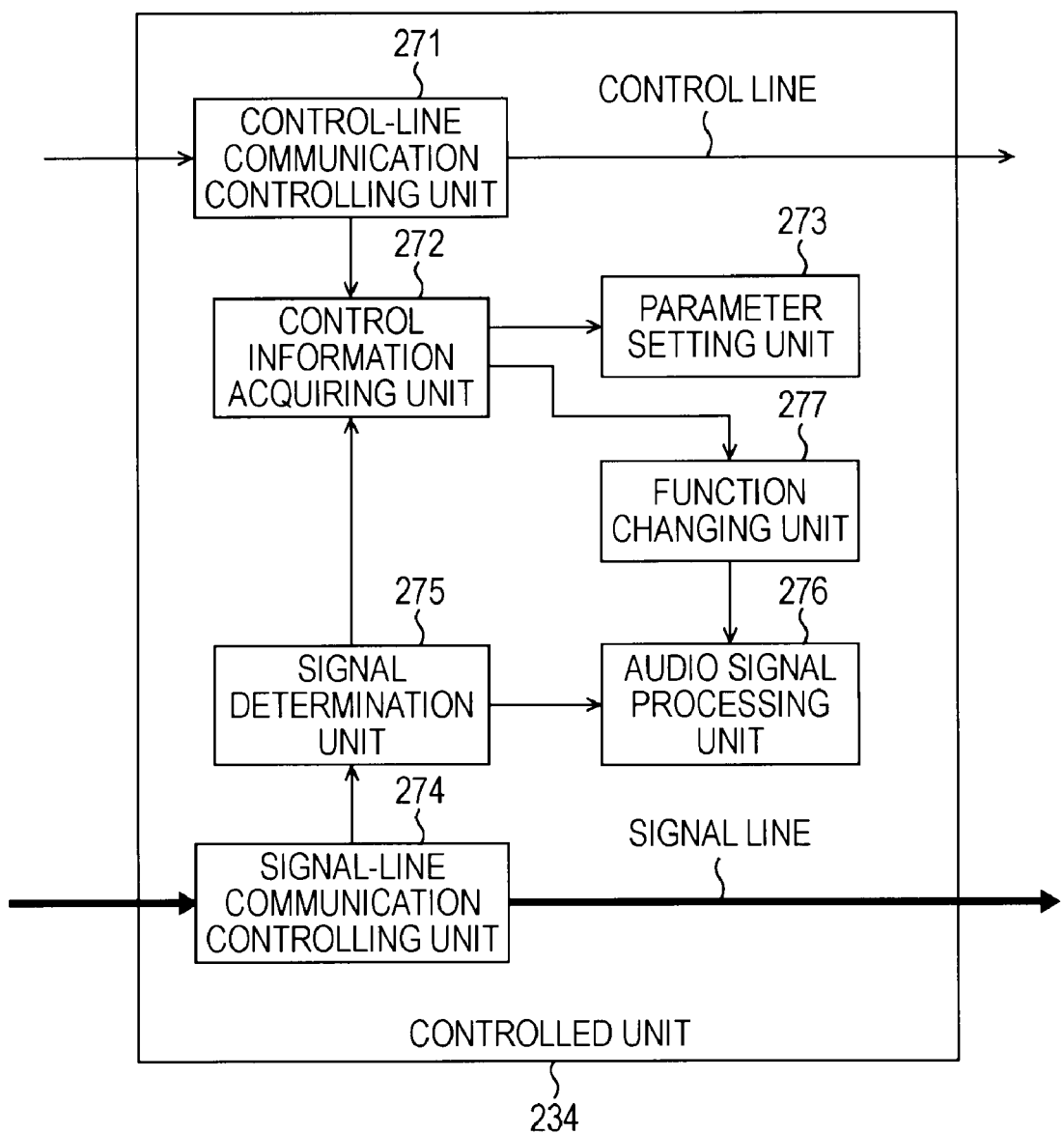
FIG. 14 is a diagram showing a configuration example of a controlled unit of the audio processing device shown in FIG. 12.

FIG. 14 shows a specific configuration example of the controlled unit 234 in FIG. 12.

The controlled unit 234 in FIG. 14 includes a control-line communication controlling unit 271, a control information acquiring unit 272, a parameter setting unit 273, a signal-line communication controlling unit 274, a signal determination unit 275, an audio signal processing unit 276, and a function changing unit 277.

In FIG. 14, the control-line communication controlling unit 271, the control information acquiring unit 272, the parameter setting unit 273, the signal-line communication controlling unit 274, the signal determination unit 275, the audio signal processing unit 276, and the function changing unit 277 respectively correspond to the control-line communication controlling unit 71, the control information acquiring unit 72, the parameter setting unit 73, the signal-line communication controlling unit 74, the signal determination unit 75, the signal processing unit 76, and the function changing unit 77 in FIG. 3. That is, the controlled unit 234 in FIG. 14 has basically the same configuration as that of the controlled unit 34 in FIG. 3, except that the audio signal processing unit 276 processes an audio signal. Thus, description of the controlled unit 234 is omitted.

Next, referring to the flowcharts in FIGS. 15 and 16, a description will be given of a communication-path selecting process in the control unit 232 in FIG. 13, and a control content executing process in the controlled unit 234 in FIG. 14.

Figure 15:
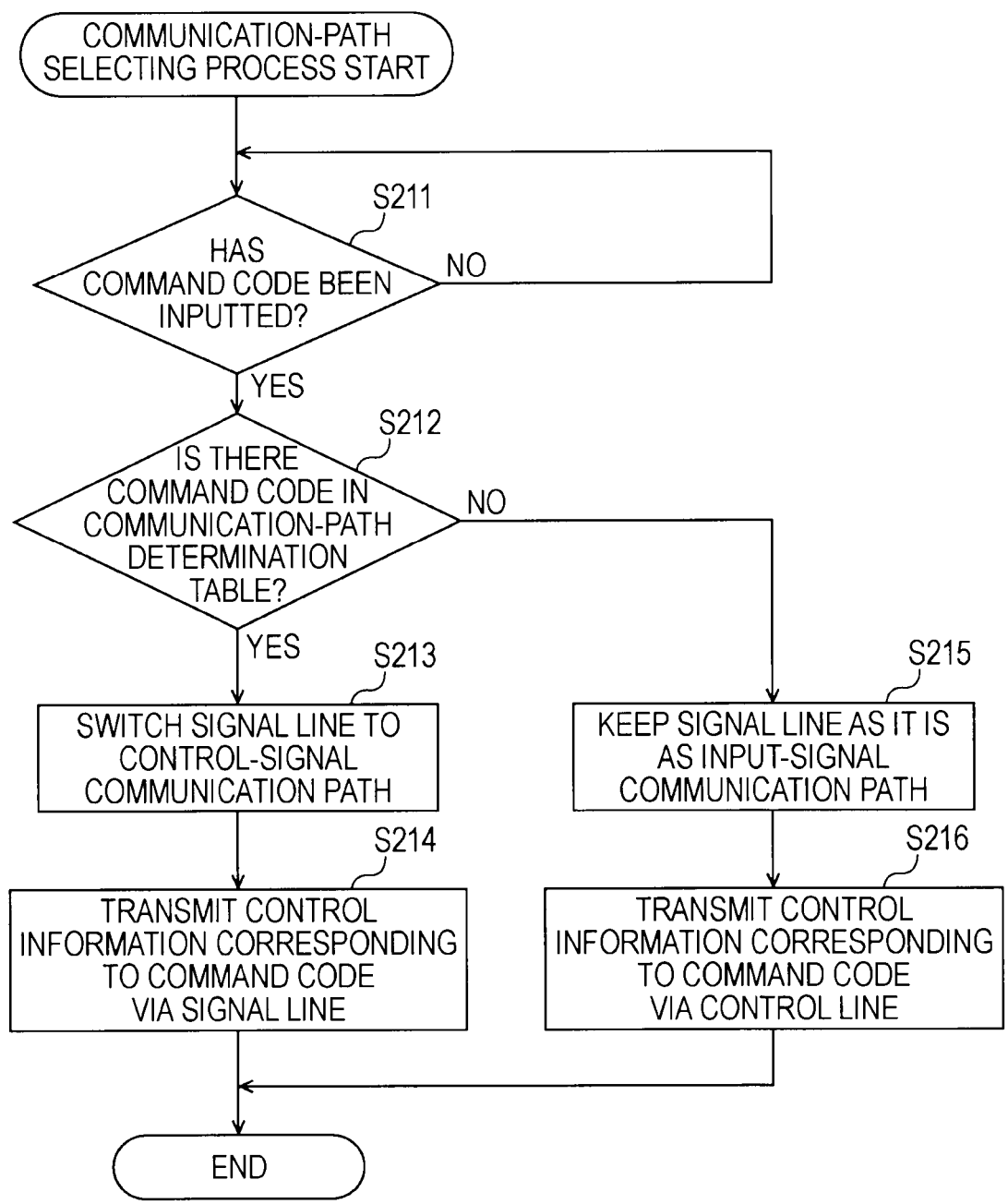
FIG. 15 is a flowchart illustrating a communication-path selecting process in the control unit of the audio processing device shown in FIG. 12.

Since the processes of step S211 and steps S213 through S216 in the flowchart of FIG. 15 are basically the same as the processes of step S11 and steps S13 through S16 in the flowchart of FIG. 4, description thereof is omitted.

Figure 16:
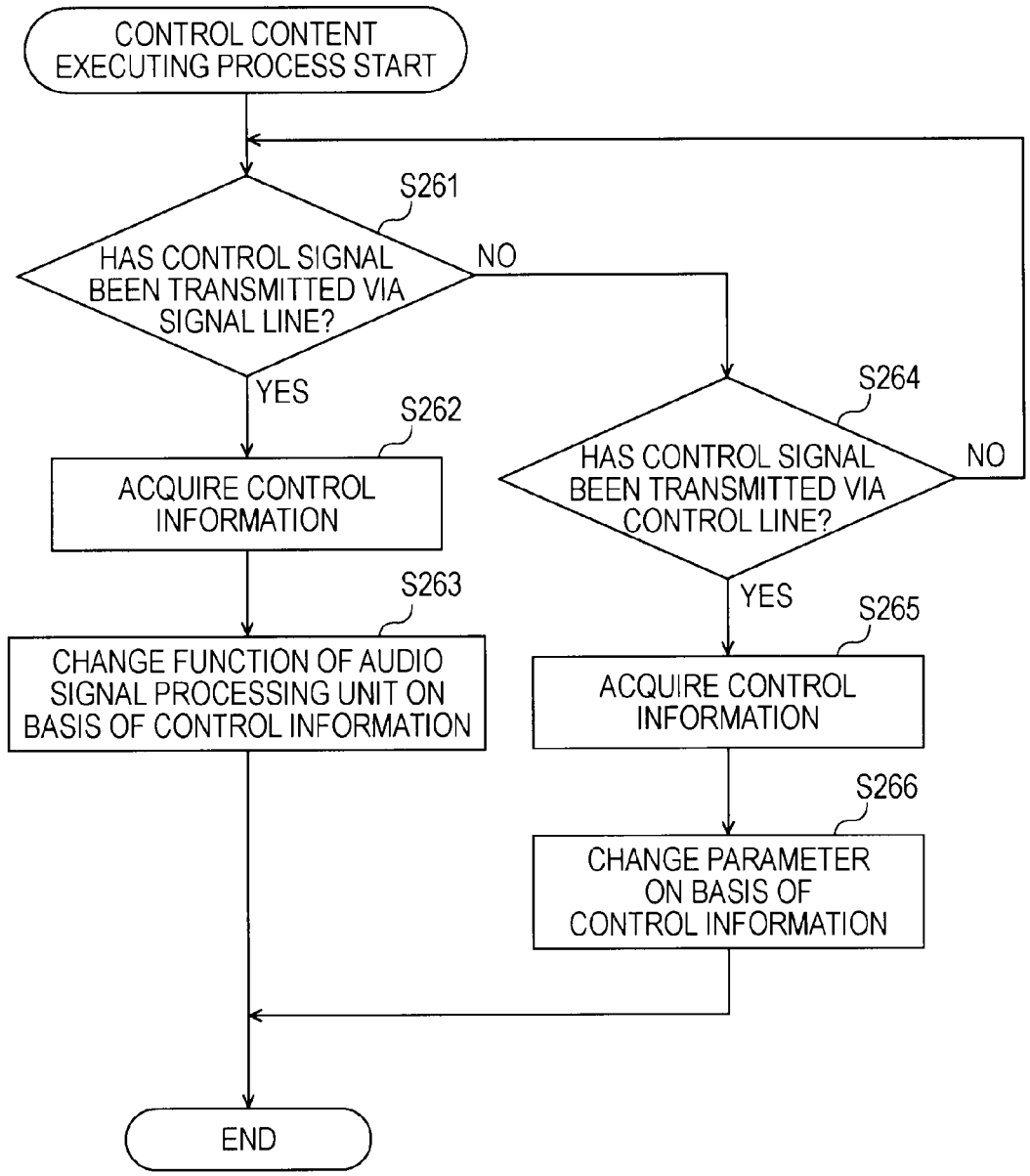
FIG. 16 is a flowchart illustrating a control content executing process in the controlled unit of the audio processing device shown in FIG. 12.

Also, since the control content executing process in FIG. 16 is performed basically in the same manner as the control content executing process described above with reference to the flowchart of FIG. 5, description thereof is omitted.

In step S212 in the flowchart of FIG. 15, the input control unit 251 determines whether or not control content information corresponding to an inputted command code is stored in the communication-path determination table 252.

Now, referring to FIG. 17, a description will be given of the communication-path determination table 252, which is looked up by the input control unit 251 in step S212 in the flowchart of FIG. 15.

As shown in FIG. 17, the communication-path determination table 252 stores control content information "Change to sampling frequency Fs=32 kHz/LPSM (Linear Pulse Code Modulation) scheme" corresponding to Command Code "100", and control content information "Change to sampling frequency Fs=44.1 kHz/LPSM scheme" corresponding to Command Code "200".

Also, the communication-path determination table 252 stores control content information "Change to sampling frequency Fs=48 kHz/LPSM scheme" corresponding to Command Code "300", and control content information "Change to sampling frequency Fs=64 kHz/LPSM scheme" corresponding to Command Code "400".

Further, the communication-path determination table 252 stores control content information "Change to sampling frequency Fs=88.2 kHz/LPSM scheme" corresponding to Command Code "500", and control content information "Change to sampling frequency Fs=96 kHz/LPSM scheme" corresponding to Command Code "600".

Also, the communication-path determination table 252 stores control content information "Change to sampling frequency Fs=192 kHz/LPSM scheme" corresponding to Command Code "700", and control content information "Change to Dolby Digital" corresponding to Command Code "800".

Further, the communication-path determination table 252 stores control content information "Change to Dolby Digital EX" corresponding to Command Code "900", and control content information "Change to Dolby Pro Logic-II" corresponding to Command Code "1000"

That is, according to the communication-path determination table 252 in FIG. 17, in the control unit 232, for example, when Command Code "400" is inputted by a user's operation (command), the input control unit 251 supplies to the communication-path selecting unit 253 a determination result indicating that the control content information "Change to sampling frequency Fs=64 kHz/LPSM scheme" corresponding to Command Code "400" is stored in the communication-path determination table 252. The communication-path selecting unit 253 causes the selector 233 to switch the signal line to a control-signal communication path, and supplies Command Code "400" to the signal-line communication controlling unit 256. On the basis of the Command Code "400" supplied from the communication-path selecting unit 253, the signal-line communication controlling unit 256 reads from the control information storing unit 255 control information necessary for effecting a change to the sampling frequency Fs=64 kHz/LPSM scheme, and supplies the control information to the selector 233. In the selector 233, since the signal line has been switched to a control-signal communication path, the control information necessary for effecting a change to the sampling frequency Fs=64 kHz/LPSM scheme is transmitted to each controlled unit 234 as a control signal via the signal line.

On the other hand, in the controlled unit 234, when the control signal containing the control information necessary for effecting a change to the sampling frequency Fs=64 kHz LPCM scheme has been transmitted via the signal line, the signal determination unit 275 acquires the control signal from the signal-line communication controlling unit 274. The control information acquiring unit 272 acquires the control information from the control signal, and supplies the control information to the function changing unit 277. On the basis of the control information supplied from the control information acquiring unit 272, the function changing unit 277 changes the function of the audio signal processing unit 276 so as to conform to the sampling frequency Fs=64 kHz LPCM scheme.

Also, in the control unit 232, for example, when Command Code "2012" is inputted by a user's operation (command), the input control unit 251 supplies to the communication-path selecting unit 253 a determination result indicating that control content information corresponding to Command Code "2012" is not stored in the communication-path determination table 252. The communication-path selecting unit 253 causes the selector 233 to keep the signal line as it is as an input-signal communication path, and supplies Command Code "2012" to the control-line communication controlling unit 254. On the basis of Command Code "2012" supplied from the communication-path selecting unit 253, the control-line communication controlling unit 254 reads from the control information storing unit 255 control information necessary for changing the level (gain) of an audio signal, and supplies the control information to the selector 233. In the selector 233, since the signal line is kept as it is as an input-signal communication path, the control information necessary for changing the level of an audio signal is transmitted to a predetermined one of the controlled units 234 via the control line.

On the other hand, in the controlled unit 234, when the control signal containing the control information necessary for changing the level of an audio signal has been transmitted via the control line, the control information acquiring unit 272 acquires the control information from the control signal, and supplies the control information to the parameter setting unit 273. On the basis of the control information supplied from the control information acquiring unit 272, the parameter setting unit 273 changes an operating parameter of the audio signal processing unit 276, thereby changing the level of an audio signal.

Through the above-mentioned processing, the control unit 232 can select a communication path over which control information is to be transmitted, in accordance with the command code. The controlled unit 234 can execute the content of control on the basis of the control information that has been transmitted via the control line or the signal line.

As a result, in a case where the volume of control information is large, the control unit 232 can transmit the control signal to the controlled unit 234 via the signal line with wide bandwidth, and the controlled unit 234 can change the function of the audio signal processing unit 276 on the basis of the control information. Also, in a case where the volume of control information is small, the control unit 232 can transmit the control signal to the controlled units 234 via the control line with narrow bandwidth, and the controlled unit 234 can set an operating parameter of the audio signal processing unit 276 on the basis of the control information. Therefore, the load on the communication path can be stabilized, which allows the controlled unit 234 to be controlled in a stable manner even when the number of the controlled units 234 increases.

While the foregoing is directed to the case of a configuration in which the control unit instructs the selector to switch the signal line, it is also possible for the control unit itself to perform switching of the signal line.

Figure 18:
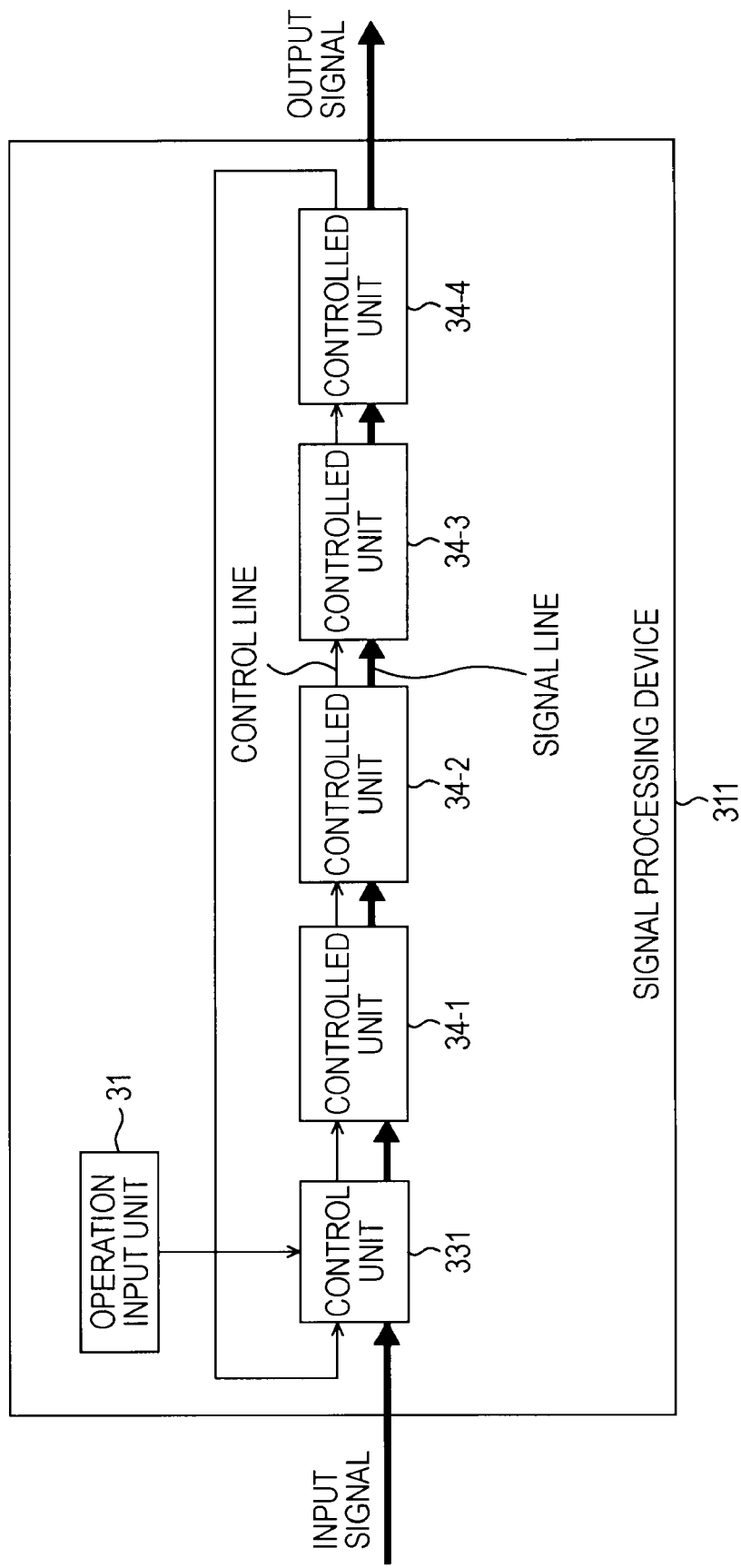
FIG. 18 is a diagram showing another configuration example of a signal processing device.

FIG. 18 shows a configuration example of a signal processing device in a case where the control unit itself performs switching of the signal line.

In FIG. 18, components corresponding to those in FIG. 1 are denoted by the same reference numerals, and description thereof is omitted. That is, a signal processing device 311 in FIG. 18 has basically the same configuration as that of the signal processing device 11 in FIG. 1, except that the signal processing device 311 includes a control unit 331, instead of the control unit 32 and the selector 33.

The control unit 331 has both the function of the control unit 32 and the function of the selector 33 in FIG. 1.

Figure 19:
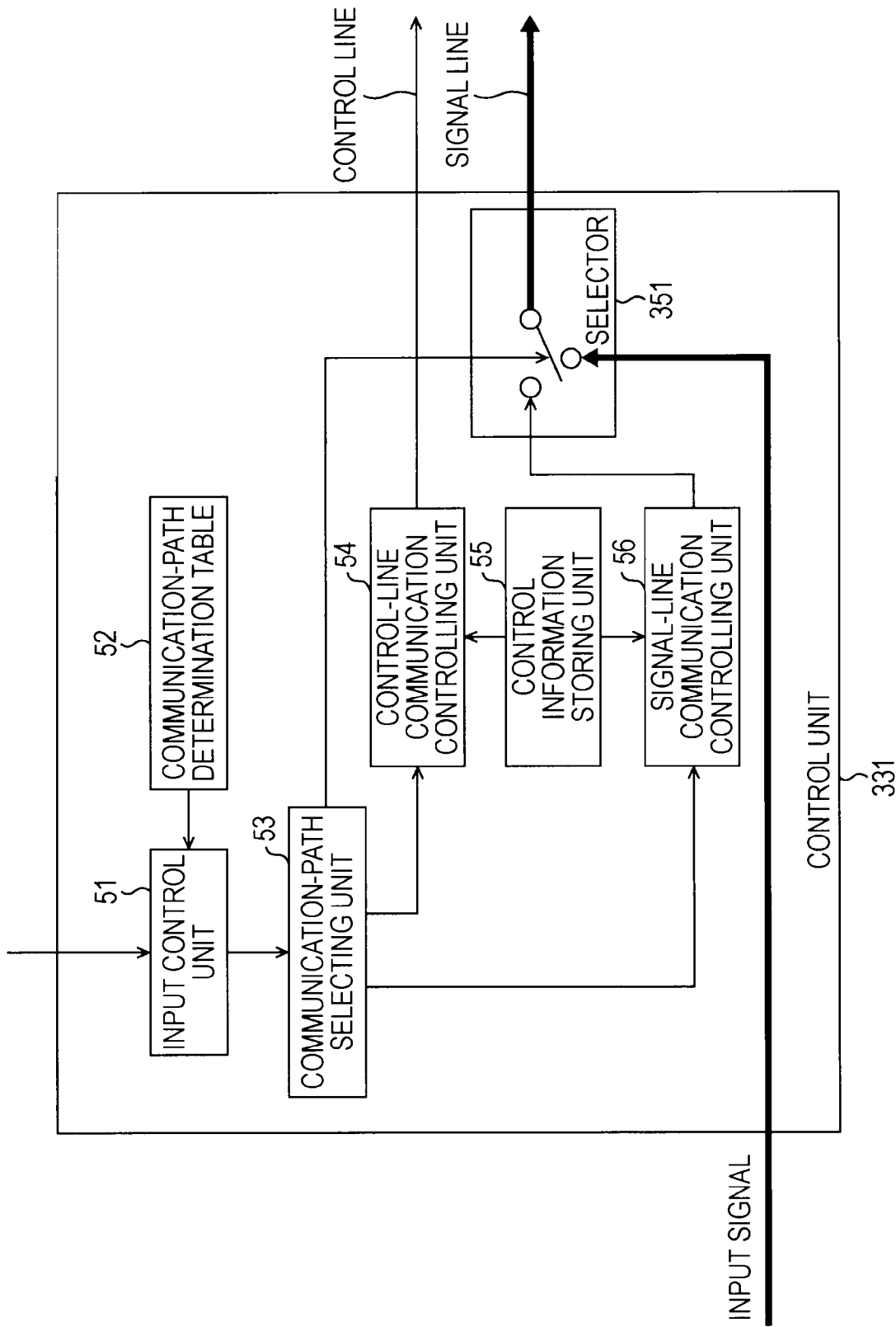
FIG. 19 is a diagram showing a configuration example of a control unit of the signal processing device shown in FIG. 18.

FIG. 19 shows a specific configuration example of the control unit 331.

In FIG. 19, components corresponding to those in FIG. 2 are denoted by the same reference numerals, and description thereof is omitted. That is, the control unit 331 in FIG. 19 has basically the same configuration as that of the control unit 32 in FIG. 2, except that the control unit 331 additionally includes a selector 351.

Also, since the selector 351 has the same configuration as that of the selector 33 in FIG. 3, description thereof is also omitted.

In this way, the control unit can be configured to include a selector inside thereof.

Since a communication-path selecting process in the control unit 331 in FIG. 19 is the same as the communication-path selecting process in the control unit 32 in FIG. 2 described above with reference to the flowchart in FIG. 3, description thereof is omitted.

In the control unit 331 in FIG. 19 as well, in a case where the volume of control information is large, the control unit 331 can transmit the control signal to the controlled unit 34 via the signal line with wide bandwidth, and in a case where the volume of control information is small, the control unit 331 can transmit the control signal to the controlled unit 34 via the control line with narrow bandwidth. Therefore, the load on the communication path can be stabilized, which allows the controlled unit 34 to be controlled in a stable manner even when the number of the controlled units 34 increases.

The foregoing description is directed to the case of a configuration in which the controlled unit performs signal processing in a serial fashion. However, it is also possible for a plurality of controlled units to apply signal processing to a single input signal in a parallel fashion, and output the resulting signal as a single output signal.

Figure 20:
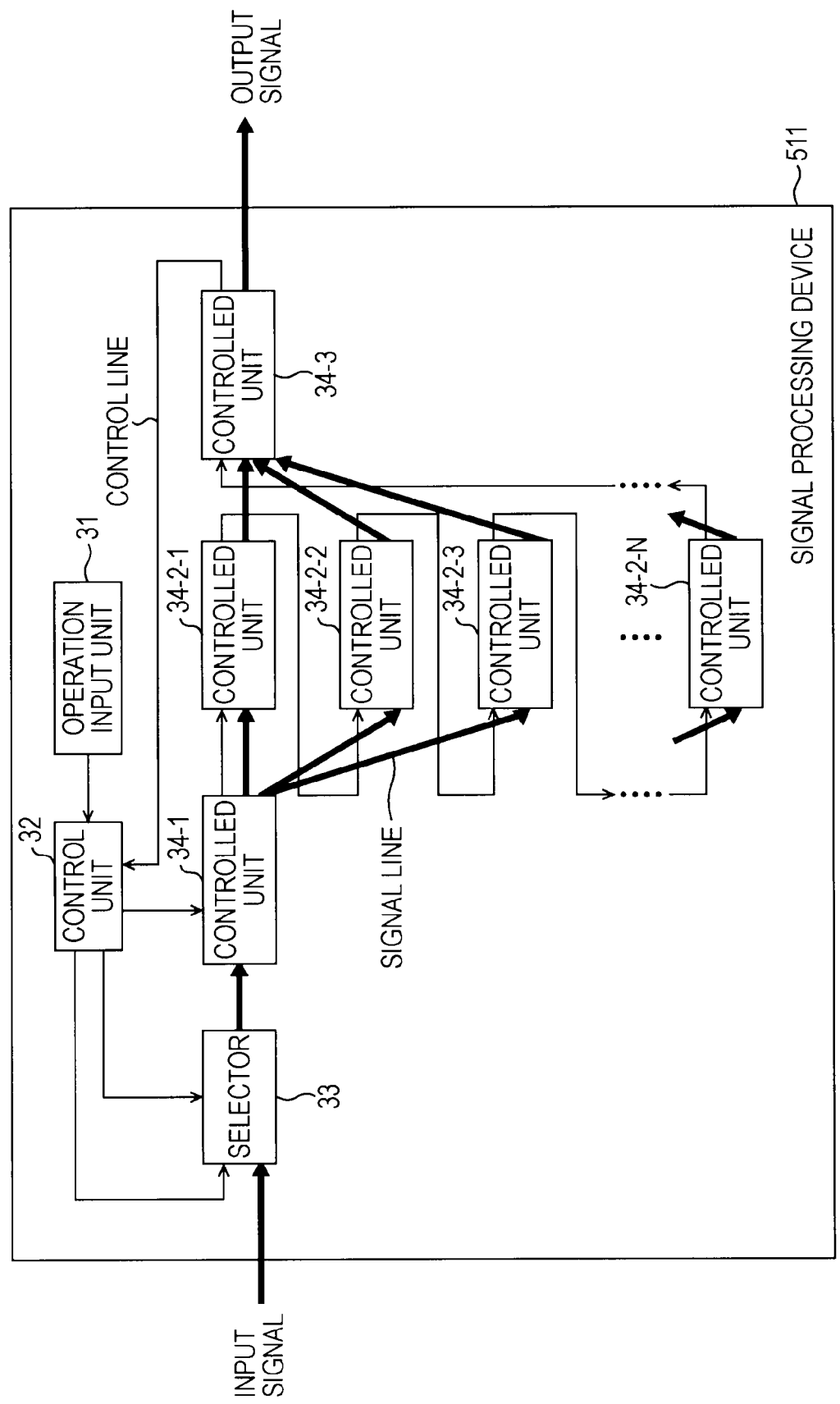
FIG. 20 is a diagram showing still another configuration example of a signal processing device.

FIG. 20 shows a configuration example of a signal processing device in which a plurality of controlled units apply signal processing in a parallel fashion.

In FIG. 20, components corresponding to those in FIG. 1 are denoted by the same reference numerals, and description thereof is omitted. That is, a signal processing device 511 in FIG. 20 has basically the same configuration as that of the signal processing device 11 in FIG. 2, except that the signal processing device 511 includes controlled units 34-2-1 through 34-2-N (N is an integer not smaller than 2) instead of the controlled unit 34-2 and does not include the controlled unit 34-4.

In the signal processing device 511, the controlled unit 34-1, the controlled units 34-2-1 through 34-2-N, and the controlled unit 34-3 (hereinafter, also simply referred to as controlled unit 34) are connected to each other in a daisy chain via the control line.

The controlled unit 34-1 splits an input signal, and supplies the resulting split signals respectively to the controlled units 34-2-1 through 34-2-N via the signal line.

The controlled units 34-2-1 through 34-2-N respectively apply predetermined signal processing to the split signals supplied from the controlled unit 34-1 via the signal line, and supply the resulting split signals to the controlled unit 34-3. Also, one of the controlled units 34-2-1 through 34-2-N, for example, the controlled unit 34-2-1, supplies a control signal to the controlled unit 34-3 via the signal line.

The controlled unit 34-3 combines the split signals respectively supplied from the controlled units 34-2-1 through 34-2-N into one output signal for output.

In the controlled unit 34 of the signal processing device 511, the controlled unit 34-1 splits an input signal, and the controlled unit 34-3 combines split signals. Supposing that such signal splitting and combining constitutes one signal processing, the controlled unit 34 can be regarded as having basically the same configuration as that of the controlled unit 34 in FIG. 3.

Therefore, in the case of the controlled unit 34 in FIG. 20 as well, in addition to setting an operating parameter of the signal processing unit on the basis of control information that has been transmitted via the control line and has a small information volume, the function of the signal processing unit can be changed on the basis of control information that has been transmitted via the control line and has a large information volume. That is, the controlled unit 34 can execute the content of control instructed by the control unit 32, on the basis of control information that has been transmitted in accordance with the load on the communication path. Thus, the control unit 32 can control the controlled unit 34 in a stable manner even when the number of the controlled units 34 increases as shown in FIG. 20.

While the foregoing description is directed to the case of a configuration in which a plurality of controlled units apply signal processing in a parallel fashion to a single input signal for output as a single output signal, a configuration is also possible in which a plurality of controlled units apply signal processing in a parallel fashion to a single input signal for output as a plurality of output signals.

Figure 21:
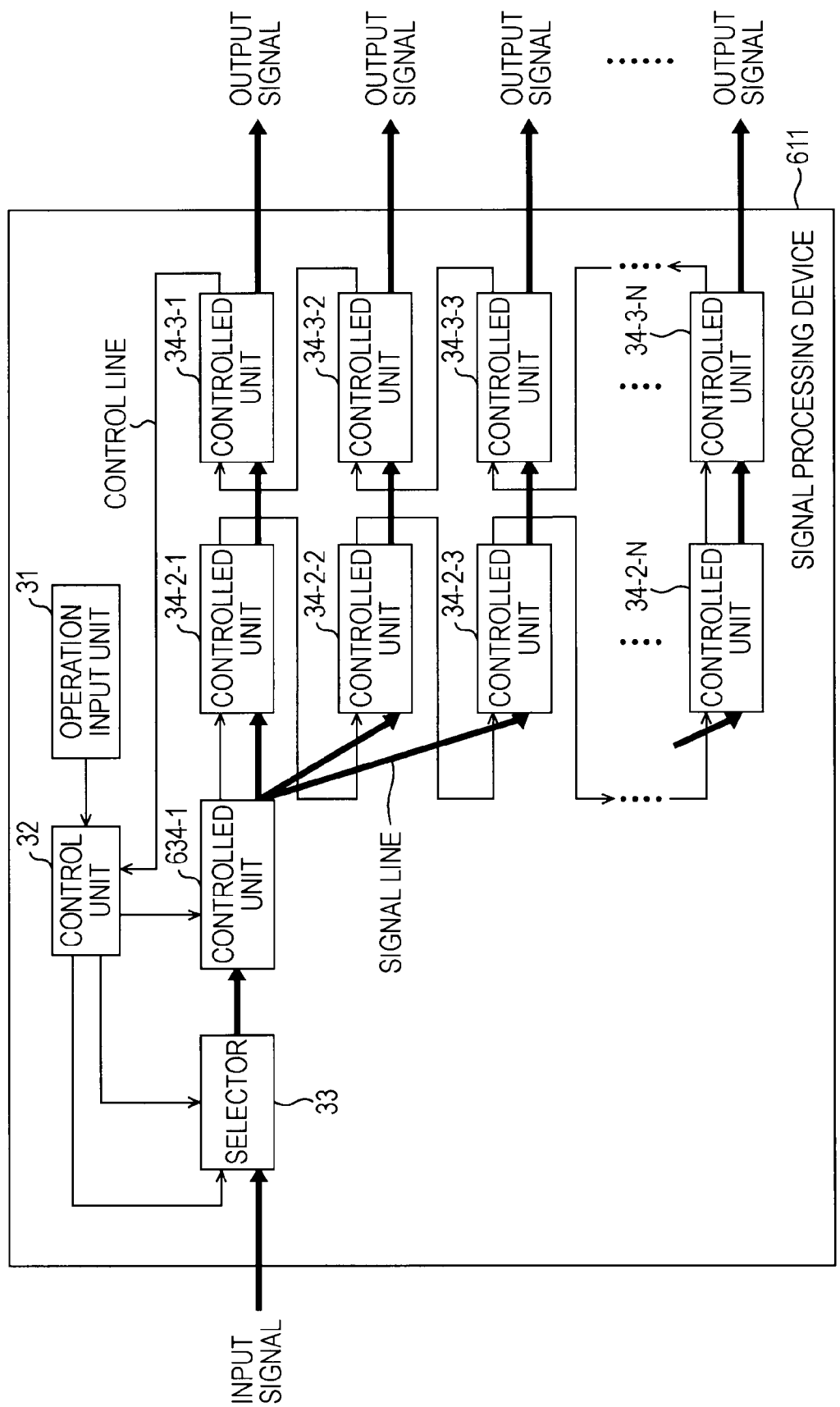
FIG. 21 is a diagram showing still another configuration example of a signal processing device.

FIG. 21 shows a configuration example of a signal processing device in which a plurality of controlled units apply signal processing in a parallel fashion to a signal for output as a plurality of output signals.

In FIG. 21, components corresponding to those in FIG. 20 are denoted by the same reference numerals, and description thereof is omitted. That is, a signal processing device 611 in FIG. 21 has basically the same configuration as that of the signal processing device 511 in FIG. 20, except that the signal processing device 611 includes controlled units 34-3-1 through 34-3-N, instead of the controlled unit 34-3.

In the signal processing device 611, the controlled unit 34-1, the controlled units 34-2-1 through 34-2-N, and the controlled units 34-3-1 through 34-3-N (hereinafter, also simply referred to as controlled unit 34) are connected to each other in a daisy chain via the control line.

The controlled units 34-2-1 through 34-2-N respectively apply predetermined signal processing to split signals supplied from the controlled unit 34-1 via the signal line, and supply the resulting signals to the controlled units 34-3-1 through 34-3-N, respectively. Also, the controlled units 34-2-1 through 34-2-N respectively supply control signals supplied from the controlled unit 34-1 via the signal line to the controlled units 34-3-1 through 34-3-N, respectively.

The controlled units 34-3-1 through 34-3-N respectively apply predetermined signal processing to the split signals respectively supplied from the controlled units 34-2-1 through 34-2-N, and output the resulting signals as output signals.

In the controlled unit 34 of the signal processing device 611, the controlled unit 34-1 splits an input signal. Supposing that such splitting of a signal constitutes one signal processing, the controlled unit 34 can be regarded as having basically the same configuration as that of the controlled unit 34 in FIG. 3.

Therefore, in the case of the controlled unit 34 in FIG. 21 as well, in addition to setting an operating parameter of the signal processing unit on the basis of control information that has been transmitted via the control line and has a small information volume, the function of the signal processing unit can be changed on the basis of control information that has been transmitted via the control line and has a large information volume. That is, the controlled unit 34 can execute the content of control instructed by the control unit 32, on the basis of control information that has been transmitted in accordance with the load on the communication path. Thus, the control unit 32 can control the controlled unit 34 in a stable manner even when the number of the controlled units 34 increases as shown in FIG. 21.

While the foregoing description is directed to the case of a configuration in which a plurality of controlled units apply signal processing in a parallel fashion to a single input signal for output as a plurality of output signals, a configuration is also possible in which a plurality of controlled units apply signal processing in a parallel fashion to a plurality of input signals for output as a single output signal.

Figure 22:
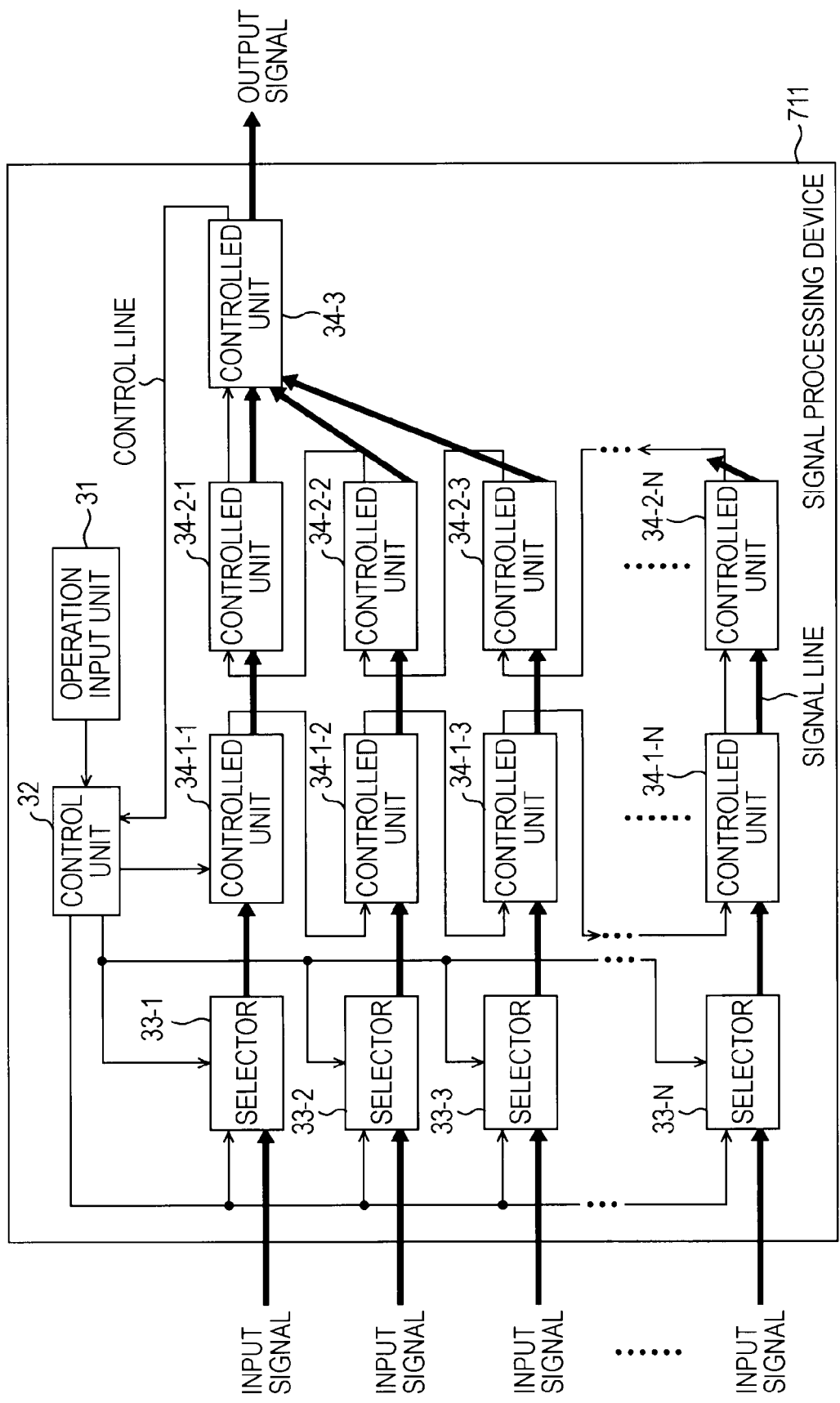
FIG. 22 is a diagram showing still another configuration example of a signal processing device.

FIG. 22 shows a configuration example of a signal processing device in which a plurality of controlled units apply signal processing in a parallel fashion to a plurality of input signals for output as a single output signal.

In FIG. 22, components corresponding to those in FIG. 20 are denoted by the same reference numerals, and description thereof is omitted. That is, a signal processing device 711 in FIG. 22 has basically the same configuration as that of the signal processing device 511 in FIG. 20, except that the signal processing device 711 includes selectors 33-1 through 33-N instead of the selector 33, and includes controlled units 34-1-1 through 34-1-N instead of the controlled unit 34-1.

The control unit 32 supplies to the selectors 33-1 through 33-N an instruction to switch the communication path, in accordance with an operation signal from the operation input unit 31. Then, the control unit 32 supplies control information necessary for executing the content of control to all or some of the controlled units 34-1-1 through 34-1-N, via the selectors 33-1 through 33-N and the signal line.

On the basis of the instruction to switch the communication path which is supplied from the control unit 32, the selectors 33-1 through 33-N each switch the signal line from an input-signal communication path to a control-signal communication path.

In the signal processing device 711, the controlled units 34-1-1 through 34-1-N, the controlled units 34-2-1 through 34-2-N, and the controlled unit 34-3 (hereinafter, also simply referred to as controlled unit 34) are connected to each other in a daisy chain via the control line.

The controlled units 34-1-1 through 34-1-N apply predetermined signal processing to input signals respectively inputted thereto, and respectively supply the resulting signals to the controlled units 34-2-1 through 34-2-N. Also, the controlled units 34-1-1 through 34-1-N respectively supply control signals supplied from the selectors 33-1 through 33-n, to the controlled units 34-2-1 through 34-2-N, respectively, via the signal line.

The controlled units 34-2-1 through 34-2-N respectively apply predetermined signal processing to split signals supplied from the controlled units 34-1-1 through 34-1-N via the signal line, and supply the resulting signals to the controlled unit 34-3. Also, one of the controlled units 34-2-1 through 34-2-N, for example, the controlled unit 34-2-1, supplies a control signal supplied from the controlled unit 34-1-1, to the controlled unit 34-3.

In the controlled unit 34 of the signal processing device 711, the controlled unit 34-3 combines input signals. Supposing that such combining of signals constitutes one signal processing, the controlled unit 34 can be regarded as having basically the same configuration as that of the controlled unit 34 in FIG. 3.

Therefore, in the case of the controlled unit 34 in FIG. 22 as well, in addition to setting an operating parameter of the signal processing unit on the basis of control information that has been transmitted via the control line and has a small information volume, the function of the signal processing unit can be changed on the basis of control information that has been transmitted via the control line and has a large information volume. That is, the controlled unit 34 can execute the content of control instructed by the control unit 32, on the basis of control information that has been transmitted in accordance with the load on the communication path. Thus, the control unit 32 can control the controlled unit 34 in a stable manner even when the number of the controlled units 34 increases as shown in FIG. 22.

While the foregoing description is directed to the case of a configuration in which a plurality of controlled units apply signal processing in a parallel fashion to a plurality of input signals for output as a single output signal, a configuration is also possible in which a plurality of controlled units apply signal processing in a parallel fashion to a plurality of input signals for output as a plurality of output signals.

Figure 23:
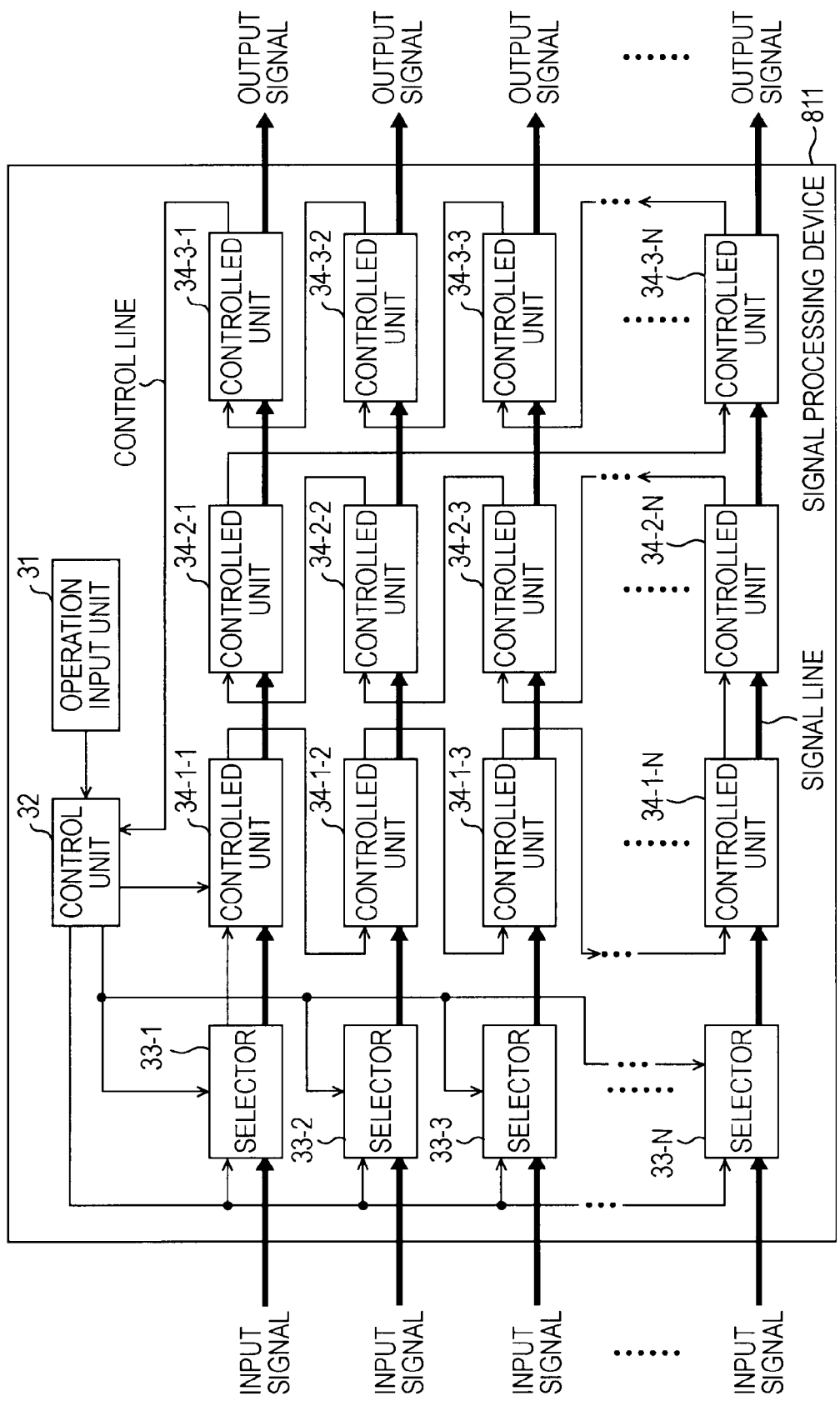
FIG. 23 is a diagram showing still another configuration example of a signal processing device.

FIG. 23 shows a configuration example of a signal processing device in which a plurality of controlled units apply signal processing in a parallel fashion to a plurality of input signals for output as a plurality of output signals.

In FIG. 23, components corresponding to those in FIG. 22 are denoted by the same reference numerals, and description thereof is omitted. That is, a signal processing device 811 in FIG. 23 has basically the same configuration as that of the signal processing device 711 in FIG. 22, except that the signal processing device 811 includes controlled units 34-3-1 through 34-3-N, instead of the controlled unit 34-3.

Also, the controlled units 34-3-1 through 34-3-N are the same as the controlled units 34-3-1 through 34-3-N described with reference to FIG. 21, and description thereof is also omitted.

In the signal processing device 811, the controlled units 34-1-1 through 34-1-N, the controlled units 34-2-1 through 34-2-N, and the controlled units 34-3-1 through 34-3-N (hereinafter, also simply referred to as controlled unit 34) are connected to each other in a daisy chain via the control line.

Also, the controlled unit 34 of the signal processing device 811 has basically the same configuration as that of the controlled unit 34 in FIG. 3.

Therefore, in the case of the controlled unit 34 in FIG. 23 as well, in addition to setting an operating parameter of the signal processing unit on the basis of control information that has been transmitted via the control line and has a small information volume, the function of the signal processing unit can be changed on the basis of control information that has been transmitted via the control line and has a large information volume. That is, the controlled unit 34 can execute the content of control instructed by the control unit 32, on the basis of control information that has been transmitted in accordance with the load on the communication path. Thus, the control unit 32 can control the controlled unit 34 in a stable manner even when the number of the controlled units 34 increases as shown in FIG. 23.

As described above, for example, in the signal processing device 11, the control unit 32 stores the communication-path determination table 52 which associates a command code indicating an instruction of a control with respect to the controlled unit 34, with control information having a large information volume among pieces of control information necessary for the controlled unit 34 to execute the content of control. When a control is instructed with respect to a plurality of the controlled units 34, the control information associated with the corresponding command code by the communication-path determination table 52 is transmitted to the plurality of controlled units 34 via the signal line. The controlled unit 34 receives the control information transmitted from the control unit 32 via the signal line, and executes the content of control on the basis of the control information. Therefore, when the volume of control information is large, the control unit 32 can transmit the control signal to the controlled unit 34 via the signal line with wide bandwidth, and the controlled unit 34 can change the function of the signal processing unit 76 on the basis of the control information. Also, when the volume of control information is large, the control unit 32 can transmit the control signal to the controlled unit 34 via the control line with narrow bandwidth, and the controlled unit 34 can set an operating parameter of the signal processing unit 76 on the basis of the control information. Therefore, the load on the communication path can be stabilized, which allows the controlled unit 34 to be controlled in a stable manner even when the number of the controlled units 34 increases.

By constructing a signal processing system with the control unit and controlled unit of the signal processing device described above serving as a control device and a signal processing device, respectively, a configuration is also possible in which a control device controls a plurality of signal processing devices.

The series of processes described above can be executed by either of hardware and software. If the series of processes is to be executed by software, a program constituting the software is installed from a program recording medium into a computer built in dedicated hardware, or into, for example, a general purpose computer that can execute various functions when installed with various programs.

Figure 24:
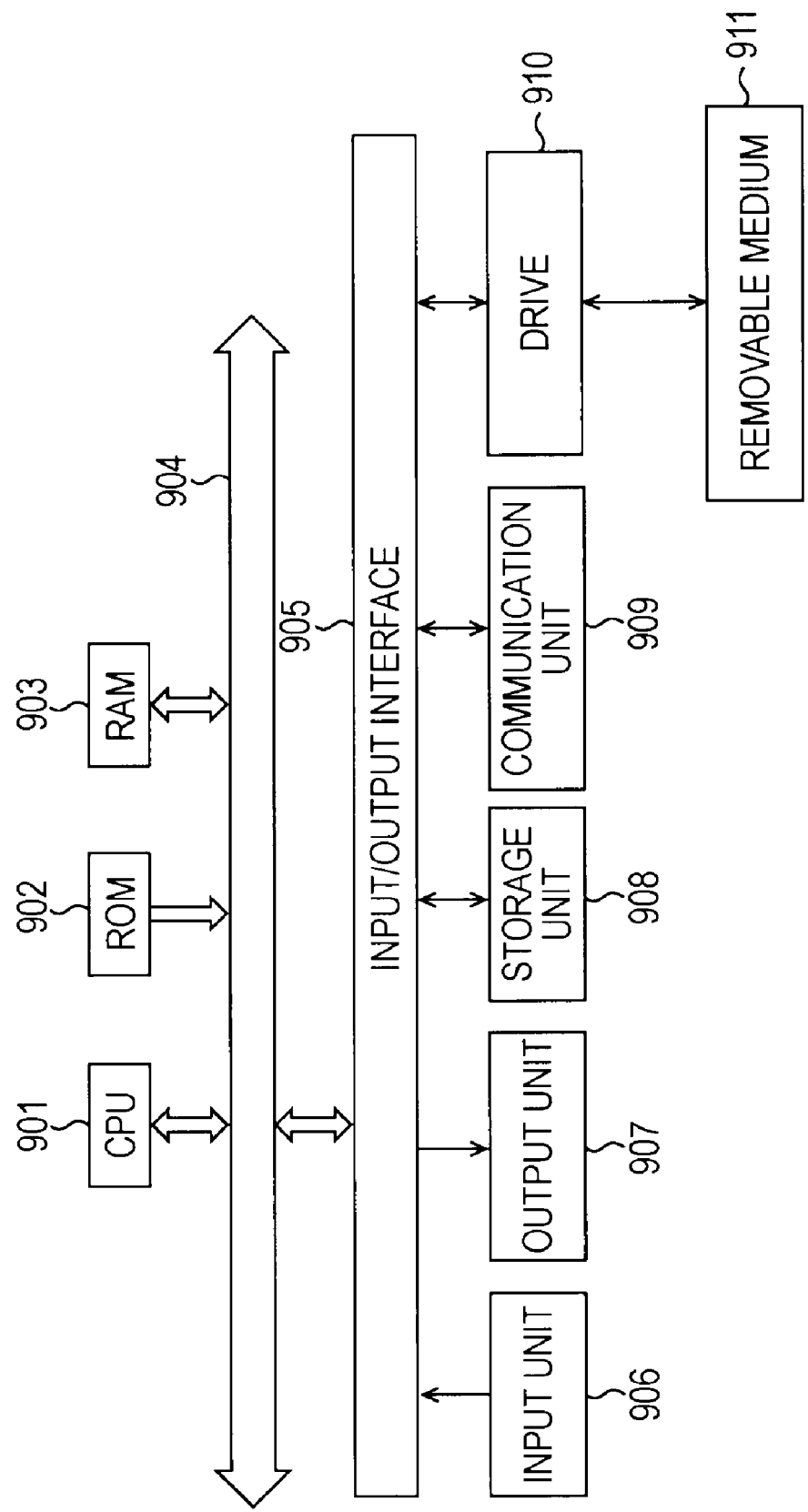
FIG. 24 is a block diagram showing a hardware configuration example of a computer that functions as a signal processing device according to an embodiment of the present invention.

FIG. 24 is a block diagram showing a hardware configuration example of a computer that executes the above-described series of processes on the basis of a program.

In the computer, a CPU (Central Processing Unit) 901, a ROM (Read Only Memory) 902, and a RAM (Random Access Memory) 903 are connected to each other via a bus 904.

The bus 904 is further connected with an input/output interface 905. The input/output interface 905 is connected with an input unit 906 configured by a keyboard, a mouse, a microphone, or the like, an output unit 907 configured by a display, a speaker, or the like, a storage unit 908 configured by a hard disk, a non-volatile memory, or the like, a communication unit 909 configured by a network interface or the like, and a drive 910 that drives a removable medium 911 such as a magnetic disc, an optical disc, a magneto-optical disc, or a semiconductor memory.

In the computer configured as described above, the CPU 901 loads, for example, a program stored in the storage unit 908 into the RAM 903 via the input/output interface 905 and the bus 904, and executes the program, thereby performing the above-described series of processes.

The program executed by the computer (CPU 901) is provided by being recorded on the removable medium 911 that is a package medium configured by a magnetic disc (including a flexible disc), an optical disc (such as a CD-ROM (Compact Disc-Read Only Memory) or a DVD (Digital Versatile Disc)), a magneto-optical disc, or a semiconductor memory, or is provided via a wired or wireless transmission medium such as the local area network, the internet, or digital satellite broadcasting.

The program can be installed into the storage unit 908 via the input/output interface 905, by mounting the removable medium 911 in the drive 910. Also, the program can be received by the communication unit 909 via a wired or wireless transmission medium, and installed into the storage unit 908. Alternatively, the program can be pre-installed in the ROM 902 or the storage unit 908.

The program executed by the computer may be a program in which processes are performed time sequentially in the order as described in this description, or may be a program in which processes are performed in parallel or at necessary timings such as when the processes are called.

In this specification, the term system refers to the whole of a device made up of a plurality of devices.

The embodiment of the present invention is not limited to the above-described embodiments, but various modifications are possible without departing from the scope of the present invention.

The present application contains subject matter related to that disclosed in Japanese Priority Patent Application JP 2008-109267 filed in the Japan Patent Office on Apr. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device which controls a plurality of signal processing units via a control line with narrow bandwidth or a signal line with wide bandwidth, the signal processing units being configured to process an input signal inputted via the signal line, comprising:
   storing means for storing correspondence information that associates instruction information indicating an instruction of control with respect to each of the signal processing units, with control information related to all of the plurality of signal processing units, among pieces of control information necessary for each of the signal processing units to execute content of control;
   determining means for determining whether to transmit the control information via the control line or the signal line based on the correspondence information stored in the storing means; and
   transmitting means for transmitting the control information associated with the instruction information by the correspondence information, to the plurality of signal processing units via the signal line or the control line based on the determination of the determining means, when control is instructed with respect to the plurality of signal processing units.

2. The signal processing device according to claim 1, further comprising:
   switching means for switching the signal line from a communication path for the input signal to a communication path for a control signal containing the control information, on the basis of the correspondence information.

3. The signal processing device according to claim 1, further comprising:
   selecting means for selecting the control line or the signal line as a communication path for transmitting a control signal containing the control information, on the basis of the correspondence information.

4. The signal processing device according to claim 1, wherein the transmitting means transmits the control information to the plurality of signal processing units connected in a daisy chain, via the signal line.

5. The signal processing device according to claim 1, wherein the control information indicates content of a change to a function of each of the signal processing units.

6. A control method for a signal processing device that controls a plurality of signal processing units via a control line with narrow bandwidth or a signal line with wide bandwidth, the signal processing units being configured to process an input signal inputted via the signal line, comprising:
   storing correspondence information that associates instruction information indicating an instruction of control with respect to each of the signal processing units, with control information related to all of the plurality of signal processing units, among pieces of control information necessary for each of the signal processing units to execute content of control;
   determining whether to transmit the control information via the control line or the signal line based on the correspondence information stored; and
   transmitting the control information associated with the instruction information by the correspondence information, to the plurality of signal processing units via the signal line or the control line based on the determination, when control is instructed with respect to the plurality of signal processing units.

7. A computer-readable storage medium having stored therein a program for causing a computer to execute a method of controlling a signal processing device that controls a plurality of signal processing units via a control line with narrow bandwidth or a signal line with wide bandwidth, the signal processing units being configured to process an input signal inputted via the signal line, the method comprising:
   storing correspondence information that associates instruction information indicating an instruction of control with respect to each of the signal processing units, with control information related to all of the plurality of signal processing units, among pieces of control information necessary for each of the signal processing units to execute content of control;
   determining whether to transmit the control information via the control line or the signal line based on the correspondence information stored; and
   transmitting the control information associated with the instruction information by the correspondence information, to the plurality of signal processing units via the signal line or the control line based on the determination, when control is instructed with respect to the plurality of signal processing units.

8. A signal processing device which has a signal processing unit that processes an input signal inputted via a signal line with wide bandwidth, the signal processing unit being controlled by a control unit via a control line with narrow bandwidth or the signal line, comprising:
    receiving means for receiving control information related to all of a plurality of signal processing units including a signal processing unit of another signal processing device, among pieces of control information necessary for executing content of control which are transmitted from the control unit via the signal line or the control line, wherein the control unit determines whether to transmit the control information via the control line or the signal line based on correspondence information stored in a storing unit at the control unit; and
    executing means for executing content of control on the signal processing unit on the basis of the received control information.

9. The signal processing device according to claim 8, further comprising:
    determining means for determining whether or not a signal transmitted via the signal line is a control signal containing the control information,
    wherein when it is determined that the signal transmitted via the signal line is the control signal, the executing means executes the content of control on the signal processing unit on the basis of the control information.

10. The signal processing device according to claim 8, wherein
    the control information indicates content of a change to a function of the signal processing unit; and
    the executing means changes the function of the signal processing unit on the basis of the control information.

11. A signal processing method for a signal processing device that has a signal processing unit that processes an input signal inputted via a signal line with wide bandwidth, the signal processing unit being controlled by a control unit via a control line with narrow bandwidth or the signal line, comprising:
    receiving control information related to all of a plurality of signal processing units including a signal processing unit of another signal processing device, among pieces of control information necessary for executing content of control which are transmitted from the control unit via the signal line or the control line, wherein the control unit determines whether to transmit the control information via the control line or the signal line based on correspondence information stored in a storing unit at the control unit; and
    executing content of control on the signal processing unit on the basis of the received control information.

12. A computer-readable storage medium having stored therein a program for causing a computer to execute a method of controlling a signal processing device having a signal processing unit that processes an input signal inputted via a signal line with wide bandwidth, the signal processing unit being controlled by a control unit via a control line with narrow bandwidth or the signal line, the method comprising:
    receiving control information related to all of a plurality of signal processing units including a signal processing unit of another signal processing device, among pieces of control information necessary for executing content of control which are transmitted from the control unit via the signal line or the control line, wherein the control unit determines whether to transmit the control information via the control line or the signal line based on correspondence information stored in a storing unit at the control unit; and
    executing content of control on the signal processing unit on the basis of the received control information.

13. A signal processing system comprising:
    a plurality of signal processing devices that process an input signal inputted via a signal line with wide bandwidth; and
    a control device that controls the plurality of signal processing devices via a control line with narrow bandwidth or the signal line,
    wherein the control device includes
        storing means for storing correspondence information that associates instruction information indicating an instruction of control with respect to each of the signal processing devices, with control information related to all of the plurality of signal processing devices, among pieces of control information necessary for each of the signal processing devices to execute content of control,
        determining means for determining whether to transmit the control information via the control line or the signal line based on the correspondence information stored in the storing means, and
        transmitting means for transmitting the control information associated with the instruction information by the correspondence information, to the plurality of signal processing devices via the signal line or the control line based on the determination of the determining means, when control is instructed with respect to the plurality of signal processing devices, and
    wherein each of the signal processing devices include
        receiving means for receiving the control information transmitted from the control device via the signal line or the control line, and
        executing means for executing content of control on the basis of the received control information.

14. A signal processing device which controls a plurality of signal processing units via a control line with narrow bandwidth or a signal line with wide bandwidth, the signal processing units being configured to process an input signal inputted via the signal line, comprising:
    a storing unit configured to store correspondence information that associates instruction information indicating an instruction of control with respect to each of the signal processing units, with control information related to all of the plurality of signal processing units, among pieces of control information necessary for each of the signal processing units to execute content of control;
    a determining unit for determining whether to transmit the control information via the control line or the signal line based on the correspondence information stored in the storing unit; and
    a transmitting unit configured to transmit the control information associated with the instruction information by the correspondence information, to the plurality of signal processing units via the signal line or the control line based on the determination of the determining unit, when control is instructed with respect to the plurality of signal processing units.

15. A signal processing device which has a signal processing unit that processes an input signal inputted via a signal line with wide bandwidth, the signal processing unit being controlled by a control unit via a control line with narrow bandwidth or the signal line, comprising:

a receiving unit configured to receive control information related to all of a plurality of signal processing units including a signal processing unit of another signal processing device, among pieces of control information necessary for executing content of control which are transmitted from the control unit via the signal line or the control line, wherein the control unit determines whether to transmit the control information via the control line or the signal line based on correspondence information stored in a storing unit at the control unit; and an executing unit configured to execute content of control on the signal processing unit on the basis of the received control information.

16. A signal processing system comprising:

a plurality of signal processing devices that process an input signal inputted via a signal line with wide bandwidth; and a control device that controls the plurality of signal processing devices via a control line with narrow bandwidth or the signal line, wherein the control device includes a storing unit configured to store correspondence information that associates instruction information indicating an instruction of control with respect to each of the signal processing devices, with control information related to all of the plurality of signal processing devices, among pieces of control information necessary for each of the signal processing devices to execute content of control, a determining unit for determining whether to transmit the control information via the control line or the signal line based on the correspondence information stored in the storing unit, and a transmitting unit configured to transmit the control information associated with the instruction information by the correspondence information, to the plurality of signal processing devices via the signal line or the control line based on the determination of the determining unit, when control is instructed with respect to the plurality of signal processing devices, and wherein each of the signal processing devices include a receiving unit configured to receive the control information transmitted from the control device via the signal line or the control line, and an executing unit configured to execute content of control on the basis of the received control information.

* * * * *